US012518115B2

(12) United States Patent
Shigeta

(10) Patent No.: US 12,518,115 B2
(45) Date of Patent: *Jan. 6, 2026

(54) CASINO SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,775

(22) Filed: Sep. 25, 2024

(65) Prior Publication Data

US 2025/0013840 A1    Jan. 9, 2025

Related U.S. Application Data

(63) Continuation of application No. 18/032,718, filed as application No. PCT/JP2021/038693 on Oct. 20, 2021, now Pat. No. 12,124,914.

(30) Foreign Application Priority Data

Oct. 21, 2020  (JP) ................. 2020-176900

(51) Int. Cl.
  *G07F 17/32*   (2006.01)
  *G06K 7/10*    (2006.01)
  (Continued)

(52) U.S. Cl.
  CPC ..... *G06K 7/10366* (2013.01); *G06K 7/10297* (2013.01); *G06K 19/047* (2013.01);
  (Continued)

(58) Field of Classification Search
  CPC ........... G06K 7/10366; G06K 7/10297; G06K 19/047; G06K 19/0723; G06K 19/07758;
  (Continued)

(56) References Cited

U.S. PATENT DOCUMENTS 5,735,742 A    4/1998  French
2002/0093426 A1  7/2002  Jackson et al.
(Continued)

FOREIGN PATENT DOCUMENTS

EP    1973081 A2    9/2008
JP    H06134140 A   5/1994
(Continued)

OTHER PUBLICATIONS

International Search Report dated Jan. 18, 2022 issued in PCT Application PCT/JP2021/038693.
(Continued)

*Primary Examiner* — Jamara A Franklin
(74) *Attorney, Agent, or Firm* — NORTON ROSE FULBRIGHT US LLP

(57) ABSTRACT

A casino system in a casino using a gaming chip to which an RFID tag storing identification information is attached, comprising a registration device for registering the identification information of the gaming chip to be used in the casino, and a database for storing a list of the identification information registered by the registration device. The list includes status information that indicates whether or not the gaming chip is usable, and the registration device makes the status information usable for the gaming chip that has already been registered.

21 Claims, 19 Drawing Sheets

(51) Int. Cl.
   *G06K 19/04*     (2006.01)
   *G06K 19/07*     (2006.01)
   *G06K 19/077*    (2006.01)

(52) U.S. Cl.
   CPC ... *G06K 19/0723* (2013.01); *G06K 19/07758* (2013.01); *G07F 17/322* (2013.01); *G07F 17/3241* (2013.01); *G07F 17/3248* (2013.01); *G07F 17/3251* (2013.01)

(58) Field of Classification Search
   CPC .............. G06K 17/0029; G07F 17/322; G07F 17/3241; G07F 17/3248; G07F 17/3251; G07F 17/3206; G07F 17/3232; G07F 17/3234; G07F 17/3239; G07F 17/3202; G07F 17/3227; G07F 17/3293
   See application file for complete search history.

(56) References Cited

U.S. PATENT DOCUMENTS

| | | |
|---|---|---|
| 2006/0094498 A1 | 5/2006 | Jorasch et al. |
| 2007/0111773 A1 | 5/2007 | Gururajan et al. |
| 2007/0184898 A1 | 8/2007 | Miller et al. |
| 2008/0113772 A1 | 5/2008 | Burrill et al. |
| 2008/0234052 A1 | 9/2008 | Steil |
| 2009/0021343 A1 | 1/2009 | Sinha |
| 2009/0149247 A1 | 6/2009 | Esbensen et al. |
| 2010/0105486 A1 | 4/2010 | Shigeta |
| 2010/0210355 A1 | 8/2010 | Koyama et al. |
| 2013/0316797 A1 | 11/2013 | Gelinotte et al. |
| 2017/0039807 A1 | 2/2017 | Shigeta |
| 2018/0075690 A1 | 3/2018 | Moore et al. |
| 2018/0144579 A1 | 5/2018 | Shigeta |
| 2018/0232987 A1 | 8/2018 | Shigeta |
| 2019/0005767 A1 | 1/2019 | Shigeta |
| 2019/0066438 A1 | 2/2019 | Yamaguchi et al. |
| 2019/0325178 A1 | 10/2019 | Nam |
| 2020/0273287 A1 | 8/2020 | Shigeta |
| 2021/0287488 A1 | 9/2021 | Shigeta |
| 2022/0139148 A1 | 5/2022 | Shigeta |
| 2022/0172552 A1 | 6/2022 | Moore et al. |

FOREIGN PATENT DOCUMENTS

| | | |
|---|---|---|
| JP | 2019005565 A | 1/2019 |
| JP | 2020131039 A1 | 8/2020 |
| NZ | 778545 A1 | 2/2022 |
| NZ | 797268 A1 | 2/2023 |
| WO | 2008120749 A1 | 10/2008 |
| WO | 2017022766 A1 | 2/2017 |
| WO | 2018025622 A1 | 2/2018 |
| WO | 2018025885 A1 | 2/2018 |
| WO | 2020158013 A1 | 8/2020 |
| WO | 2020158039 A1 | 8/2020 |

OTHER PUBLICATIONS

International Search Report dated Jan. 18, 2022 issued in PCT Application PCT/JP2021/038694.
European Search Report dated Jun. 30, 2023 issued for EP Application 21203169.4.
Australian Examination Report No. 3 dated Oct. 12, 2023 issued for AU Application 2021254516.
U.S. Office Action dated Sep. 14, 2023 issued for U.S. Appl. No. 17/504,764.
US Office Action dated Feb. 6, 2025, issued in U.S. Appl. No. 17/504,764.
New Zealand Patent Examination Report 1 dated Nov. 18, 2024, issued in NZ Application No. 781385.
Japanese Office Action dated Apr. 30, 2025, issued in JP Application No. 2024-129794.
US Office Action dated May 16, 2025, issued in U.S. Appl. No. 18/032,736.
Japanese Office Action dated Oct. 14, 2025, issued in JP Application No. 2022-192545.

| CHIP ID | IN/OUT | FROM | TO | TIME | |
|---|---|---|---|---|---|
| 24825 | OUT | MAIN BANK | | | ~ H61 |
| 24825 | IN | MAIN BANK | F/C BANK | | ~ H62 |

| CHIP ID | IN/OUT | FROM | TO | TIME | |
|---------|--------|---------|---------|------|------|
| 24825 | OUT | TABLE-4 | F/C BANK | | ~H71 |
| 24825 | IN | | F/C BANK | | ~H72 |

| 601 | 602 | 603 | 604 |
|---|---|---|---|
| CHIP ID | IN/OUT | LOCATION | TIME |
| 24825 | OUT | VAULT | | ～H81
| 24825 | IN | MAIN BANK | | ～H82

FIG.17

| 601 | 603 | 604 | |
|---|---|---|---|
| CHIP ID | LOCATION | TIME | |
| 24825 | VAULT | | ~H91 |
| 24825 | MAIN BANK | | ~H92 |

FIG.18

| CHIP ID | IN/OUT | LOCATION | TIME | |
|---|---|---|---|---|
| 24825 | OUT | CASHIER-2 | | ~H101 |
| 24825 | IN | PLAYER-5 | | ~H102 |
| 24825 | OUT | PLAYER-5 | | ~H103 |
| 24825 | IN | CASHIER-3 | | ~H104 |

CASINO SYSTEM

CROSS-REFERENCE OF RELATED APPLICATIONS

This application is a continuation of U.S. patent application Ser. No. 18/032,718 filed Oct. 20, 2021, which is a national phase application under 35 U.S.C. § 371 of International Pat. App. PCT/JP2021/038693 filed Oct. 20, 2021, which claims priority to JP Pat. App. 2020-176900 filed Oct. 21, 2020. The contents of each application are hereby incorporated by reference.

TECHNICAL FIELD

The present invention relates to a casino system applied to casinos that use casino item, a casino item usable in casinos, and a method for manufacturing casino item.

BACKGROUND TECHNOLOGY

Casino items used in casinos requires a high level of security, and casino items should be strictly managed. For example, casino items are manufactured in a manufacturing factory, but there is a risk of theft by malicious persons during the process of transporting the items from the manufacturing factory to the casino and using those on the floor area. There is also a risk of counterfeit casino items being used in the floor area of the casino to help players win the game unfairly.

The casino items that require high security are typically gaming chips. Each gaming chip is given a unique identifier. The gaming chip contains an RFID tag, which stores the identification information. The casino system will also use a database that stores the identification information of the gaming chips. By reading the identification information from the RFID tag of the gaming chip and referring to the database at each of multiple locations in the casino that handle casino items, various security managements can be performed (see, for example, International Application Publication No. WO2008/120749).

SUMMARY OF THE INVENTION

The purpose of the present invention is to enhance the security management of casino items given identification information.

One type of casino system is a casino system in a casino that uses a casino item to which an RFID tag storing identification information is attached, and is equipped with a registration device that registers the identification information of the casino item that can be used in the casino, and a storage device that stores a list of the identification information registered by the registration device. The registration device performs an invalidation process to invalidate the registration of the identification information of the casino item when the casino item whose identification information is stored in the storage device as usable casino item meet the specified conditions.

With this configuration, the registration of casino item that meet the predetermined conditions for invalidating the registration can be invalidated, and the invalidation process can be performed for casino item that were once registered but later became in a state where they should not be registered. The invalidation process includes deleting the item from the list of the storage device, storing the information that the item is invalid in the list of the storage device, and further includes storing the information that the item is suspicious, needs attention, or is a candidate for invalidation in the list of the storage device.

In the casino system described above, the system is further equipped with a reader that reads the identification information from the RFID tag of the casino item to be registered. The identification information of the casino item that is determined to be genuine can be registered as the identification information of the usable casino item.

This configuration can guarantee that the casino item to be registered are genuine.

The casino system described above, may be further equipped with a reader that reads the identification information from the RFID tag of the casino item to be registered, and the registration device may register the identification information read by the reader.

This configuration can prevent incorrect registration in which the identification information stored in the RFID tag of the casino item differs from the identification information stored in the storage device by the registration device.

The casino system described above, may be further equipped with a reader that reads the RFID tags of the plurality of the casino item housed in a case, and the registration device may register the plurality of the identification information read by the reader.

With this configuration, the registration work can be performed quickly and smoothly.

In the casino system described above, the registration device may store the identification information of the usable casino items with a flag indicating that they are usable.

With this configuration, the invalidation process can be performed by updating the flag.

The casino system described above, may be further equipped with a reader that reads the identification information from the RFID tag of the casino item, and the registration device may perform the invalidation process for the casino item for which the identification information cannot be effectively read by the reader.

With this configuration, the registration of casino item whose RFID tag is malfunctioning can be invalidated.

The above, casino system described above, may be further equipped with a reader that reads the identification information from the RFID tag of the casino item, and the casino item may carry information for identifying the casino item in a manner other than the RFID tag. The registration device may identify the casino item whose registration should be invalidated using the information to identify the casino item, and perform the invalidation process for the casino item whose identification information cannot be read by the reader.

With this configuration, even when the RFID tag is faulty and its identification information cannot be read, the casino item to be invalidated can be identified by relying on the identification information carried by other manner.

In the casino system described above, the registration device may perform the invalidation process on the casino item that are related to or suspected to be related to an illegal game.

This configuration allows the invalidation process to be performed on the casino items that are related to (or suspected to be related to) an illegal game, thus reducing the possibility that inappropriate casino items will continue to be used even when the game irregularity is discovered but a problematic casino item cannot be identified.

The casino system described above, may be further equipped with a reader that reads the identification information from the RFID tag of the casino item, and the casino item may carry information for identifying the casino item in a manner other than the RFID tag, and the registration device may read the information from the RFID tag of the casino item with the reader. When the identification information read from the RFID tag of the casino item is not registered as the identification information of the usable casino item in the registration device, the registration device may identify the casino item whose registration should be invalidated using the information for identifying the casino item, and perform the invalidating process.

With this configuration, when the identification information read from the RFID tag is not registered (e.g., it is assumed that the identification information of the RFID tag has been illegally rewritten), the identification information carried by other manner can be used to identify the correct identification information of the casino item and perform the invalidation process, and the invalidation process can be performed.

In the casino system described above, the RFID tag may store manufacturing information indicating the manufacturing status of the casino item, type information indicating the type of the casino item, and/or information on the casino in which the casino item is used, and the storage device may store the manufacturing information, type information, and information on the casino in which the casino item is used, along with the identification information. If the manufacturing information, the type of information, and/or the information of the casino stored in the RFID tag does not match the manufacturing information, the type of information, and/or the information of the casino stored in the storage device, the invalidation process may be performed for the casino item with the identification information.

With this configuration, if the combination of the identification information stored in the RFID tag and the other manufacturing information is different from the combination stored in the storage device, the registration invalidation process can be performed for such a casino item.

In the casino system described above, the registration device may store in the storage device information indicating the year and month of registration for the identification information of the usable casino items, and perform the invalidation process for the casino items for which a predetermined period of time has elapsed since the year and month of registration by referring to the storage device.

With this configuration, a usable period can be set for casino items, and the invalidation process can be performed for casino items that have exceeded the usable period.

The casino system described above, may have a management device at each of the plurality of casino item handling locations in the casino that notifies the registration device of the identification information of the casino item to be invalidated, and the registration device may, based on the notification from the management device, perform the invalidation process for the relevant casino item.

This configuration allows the casino item handling location to determine whether or not the casino item meets the conditions for invalidating the registration, and allows the registration device to perform the invalidation process. The management device may determine on its own that the invalidation process should be carried out for the casino item by performing the prescribed information processing on the detected values of various sensors (including cameras) and make a notification, or it may receive instructions from the operator (e.g., dealer) and make a notification accordingly.

The casino system described above, may further comprise a storage tray for storing the casino item owned by the casino at the casino item handling location, and a reading device that monitors the casino item by periodically reading the RFID tags of the casino item stored in the storage tray. In the reading device, the invalidation process may be performed for the casino items that have been illegally taken out of the storage tray.

With this configuration, the casino items illegally taken out of the storage tray can be invalidated and cannot be used.

In the casino system described above, the casino may use a plurality of types of casino items, and the registration device may store the type of the casino items along with the identification information in the storage device for each of the plurality of types of casino items, and the registration device may perform the invalidation process for a specific type of casino items.

With this configuration, when a new version of a specific type of casino items (e.g., $10 gaming chips) is introduced and the use of the old version is stopped, the old version can be invalidated simultaneously (e.g., after a certain period of notice and grace).

The casino system described above, may have a reader at each of the plurality of casino item handling locations in the casino to read the identification information from the RFID tag of the casino item, and the registration device may read the same identification information at the readers of the plurality of casino item handling locations. In the case where the same identification information is read by the reading devices of the plurality of the casino item handling locations, when the combination of the readings satisfies the conditions for determining fraud, the registration device may perform the invalidation process for the casino item having the identification information.

With this configuration, it is possible to identify the illegal casino item and perform the invalidation process for the identified casino item. For example, if the same identification information is read at two casino item handling locations that are far apart from each other within a very small time interval, it can be determined that there are multiple casino item with the same identification information, and the invalidation process can be performed. Also, if the identification information of a casino item collected by the dealer and stored in the chip tray is subsequently read as the identification information of a gaming chip bet in the betting area of the table, it can be determined that there is more than one casino item with such identification information, or that the gaming chip was stolen from the chip tray, and the invalidation process can be performed.

The casino system described above, may have a reader at each of the plurality of casino item handling locations in the casino that reads the identification information from the RFID tag of the casino item, and the registration device may perform the invalidation process for the casino item which identification information has not been read by the reader at any of the casino item handling locations in the casino for a predetermined period of time or longer.

This configuration allows the invalidation process to be performed for casino item that has not been used by a player for a predetermined period of time or longer.

The casino system described above, may be further equipped with a reader that reads the identification information from the RFID tag of the casino item to be invalidated, and the registration device may perform the invalidation process for the identification information read by the reader.

This configuration allows the invalidation process to be performed by correctly grasping the identification information of the casino item to be invalidated.

In the casino system described above, the entrance of the casino may be equipped with a detection device that detects the casino item brought in from outside the casino, and the registration device may perform the invalidation process for the casino item detected by the detection device.

With this configuration, if a casino item is brought into the casino floor from the entrance despite the fact that it is prohibited, the invalidation process can be performed for the casino item brought in.

The above, casino system is further provided with a reader installed at a casino item handling location in the casino to read the identification information from the RFID tag of the casino item, and a verification device to check the identification information read from the casino item by the reader against the identification information stored in the storage device.

With this configuration, it is possible to confirm whether or not the casino item handled at a casino item handling location are the ones that have been registered.

In the casino system described above the verification device normally compares the identification information read by the reader with the identification information read immediately before by the reader, and if there is a difference between the two, the verification device may match the identification information read by the reader with the identification information stored in the memory device. If there is a difference between the two, the identification information read by the reader and the identification information stored in the storage device can be checked.

This configuration can reduce the load of the verification process compared to the case where the verification is performed on the registration device every time.

In the casino system described above, when there is new identification information in the identification information read by the reading device that is not in the identification information read immediately before by the reading device, the verification device may verify the new identification information with the identification information stored in the storage device.

With this configuration, the load of the verification process can be reduced compared to the case where verification is performed for all casino item, because verification can be performed for casino item that are newly brought into the casino item handling location.

In the casino system described above, the verification device normally compares the identification information read by the reader with the identification information read immediately before by the reader, and under predetermined conditions, compares the identification information read by the reader with the identification information of the casino item stored in the storage device.

This configuration allows the matching of casino item based on changes in the casino item at the casino item handling location.

In the casino system described above, the identification information may include the tag identification information assigned by the manufacturer who manufactured the RFID tag and the item identification information assigned by the manufacturer who manufactured the casino item to which the RFID tag is attached.

This configuration can enhance the security of casino items.

In the casino system described above, the verification device normally verifies the item identification information read from the casino item by the reading device with the item identification information read immediately before by the reading device, and, at a predetermined timing and/or under a predetermined condition, verifies the tag identification information read from the casino item by the reading device with the tag identification information stored in the storage device.

With this configuration, a plurality of security levels can be established for verification, and verification that emphasizes security level and verification that emphasizes speed can be used separately.

In the casino system described above, the registration device deletes the identification information in the list stored in the storage device as the invalidation process, adds a flag indicating that the identification information in the list stored in the storage device is invalid, or adds a flag indicating that the identification information in the list stored in the storage device is invalid.

With this configuration, as a invalidation process, a status of suspicious can be given to the casino item, and although it cannot be confirmed that it is an illegal casino item, it can alert the user when it is suspicious.

In the casino system described above, the registration device may be prohibited from the subsequent registration of the identification information of the casino item identified as those to be invalidated, if the identification information has not been registered.

This configuration can prevent the future registration of the identification information once it is related to fraud.

In the casino system described above, the registration device may prohibit the subsequent registration of the invalidated identification information.

This configuration can prevent the future registration of identification information once it has been invalidated.

In the casino system described above, the casino item may be used for betting in the game by the player in the casino, and may be redeemable for cash.

This configuration enhances the security of casino items that are redeemable for cash.

One type of casino item is a casino item used in any of the casino system described above, the casino item is has an RFID tag storing the identification information.

BRIEF DESCRIPTION OF THE DRAWINGS

FIG. 15 shows an example of data in a chip management database that is updated by the first method of managing movement of the gaming chips according to the second embodiment of the present invention.

FIG. 16 shows an example of data in a chip management database that is updated by the second method of managing movement of the gaming chips according to the second embodiment of the present invention.

FIG. 17 shows an example of data in a chip management database that is updated by the fourth method of managing movement of the gaming chips according to the second embodiment of the present invention.

FIG. 18 shows an example of data in a chip management database that is updated by the fifth method of managing movement of the gaming chips according to the second embodiment of the present invention.

FIG. 19 shows an example of data in a chip management database that is updated by the fourth method of managing movement of the gaming chips according to the second embodiment of the present invention.

DETAILED DESCRIPTION OF THE EMBODIMENT

The following is a detailed description of the casino system and the method for manufacturing casino item with reference to the drawings. However, the invention is not limited by the following embodiments, and the components in the following embodiments include those that can be easily assumed by those skilled in the art or those that are substantially the same.

First Embodiment

In the following, we will explain an example in which the casino item is a gaming chip as a substitute coin for playing games, but the casino item may be something other than a gaming chip, such as a substitute coin for playing games that can be used for betting on games or that can be redeemed for money, called a plaque, jetton, or token. Casino item is not limited to substitute money for playing games, but can also be, for example, a shuffled playing card package in which multiple decks of playing cards are shuffled and packaged. Further, the casino item does not have to be an item that is distributed in the casino, such as gaming chips, and do not have to be an item that is consumed in large quantities in the casino and discarded, such as shuffle playing card packages, but can be, for example, membership cards held by players. The casino item managed in this embodiment may also be referred to as security item, among others.

Figure 1:
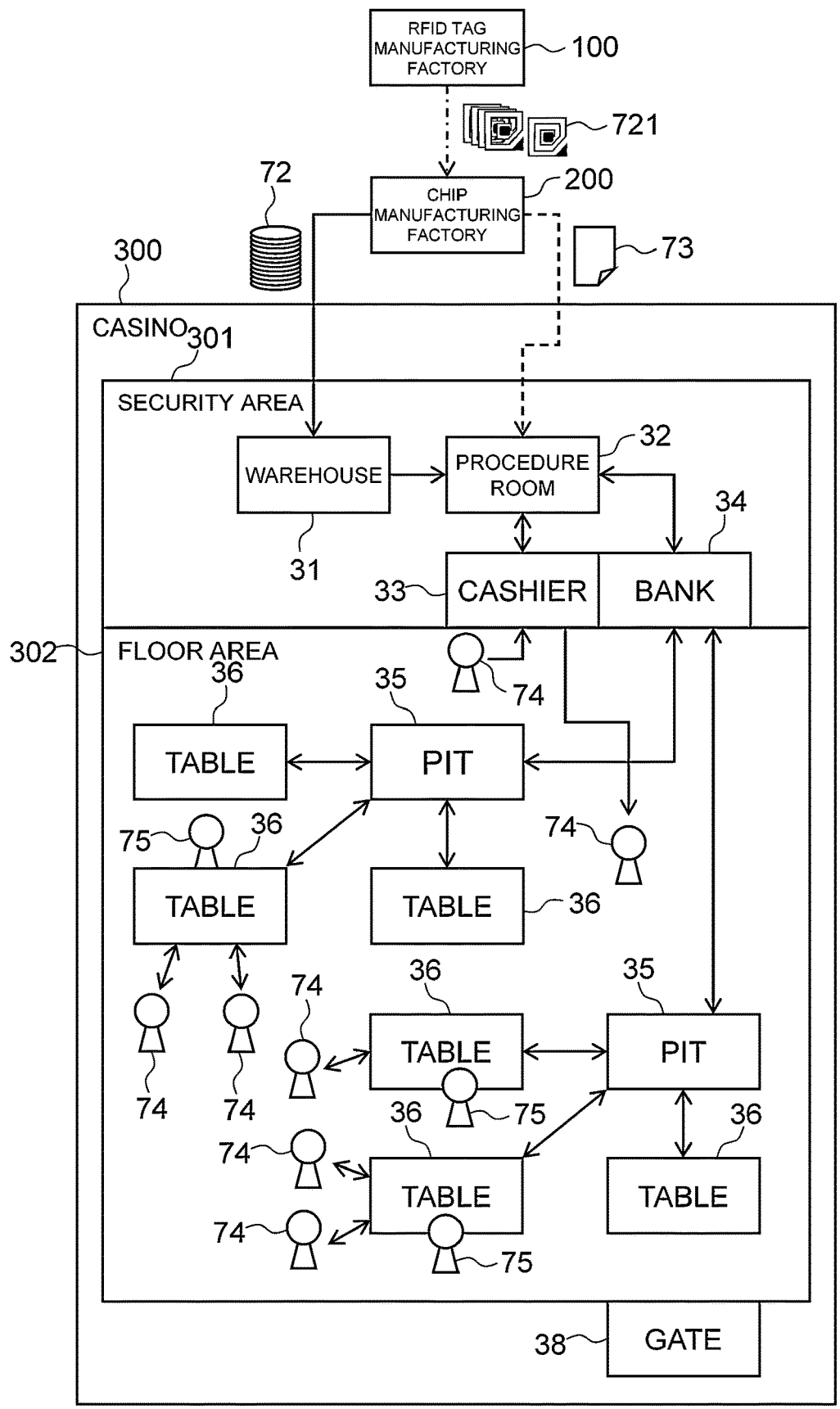
FIG. 1 shows a process of manufacturing and using a casino item according to the first embodiment of the present invention.
Figure 2:
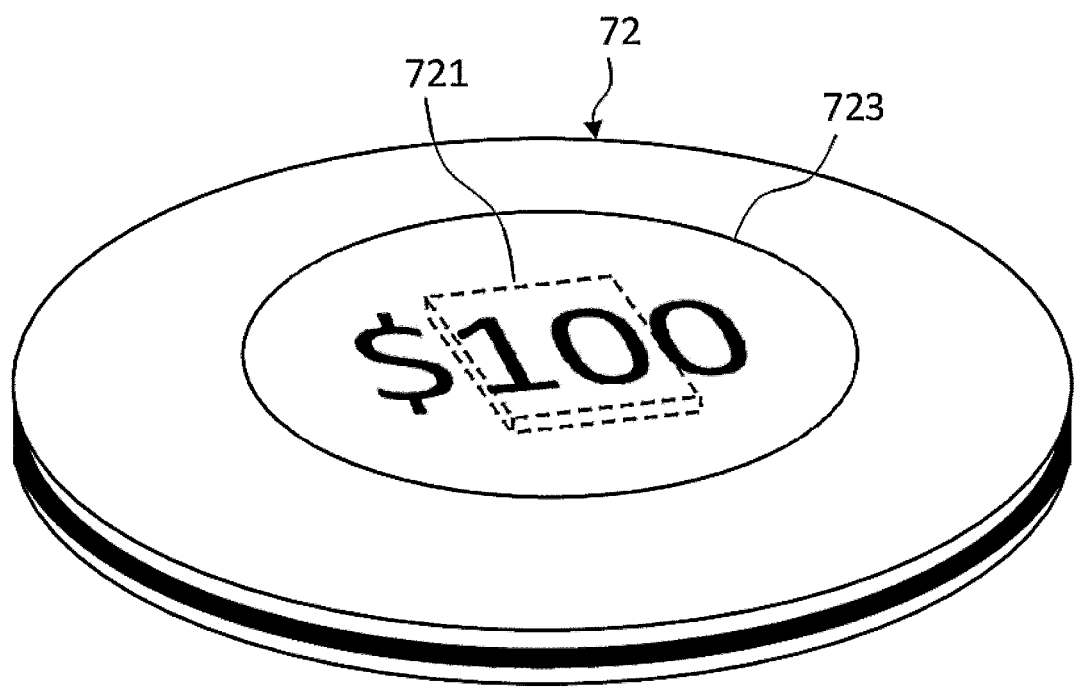
FIG. 2 shows a diagram of a gaming chip as a casino item according to the first embodiment of the present invention.

FIG. 1 shows a process of manufacturing and using a casino item according to the first embodiment of the present invention. FIG. 2 shows a diagram of a gaming chip as a casino item according to the first embodiment of the present invention. The gaming chip 72 has a different color for each value. In other words, the color of the gaming chip 72 represents the value of the gaming chip 72. As shown in FIG. 2, the side of the gaming chip 72 shows a pattern that represents the value of the gaming chip 72. In this embodiment, a striped pattern including a color representing the value appears on the side, and the value of the gaming chip 72 can be determined by only observing the side of the chip 72 by this color. In addition, a decal 723 is affixed to the centers of the front surface and the back surface of the gaming chip 72, and a number indicating the value of the gaming chip 72 is indicated on the decal 723. In addition, an RFID tag 721 is built into the gaming chip 72.

As shown in FIG. 1, the chip manufacturing factory 200 as a chip manufacturer procures RFID tags 721 from the RFID tag manufacturing factory 100, uses them to manufacture gaming chips 72 with embedded RFID tags 721, and provides them to the casino 300. The casino 300 purchases gaming chips 72 with built-in RFID tags 721 from the chip manufacturing factory 200, and operates games using the gaming chips 72 in the floor area 302.

Figure 3:
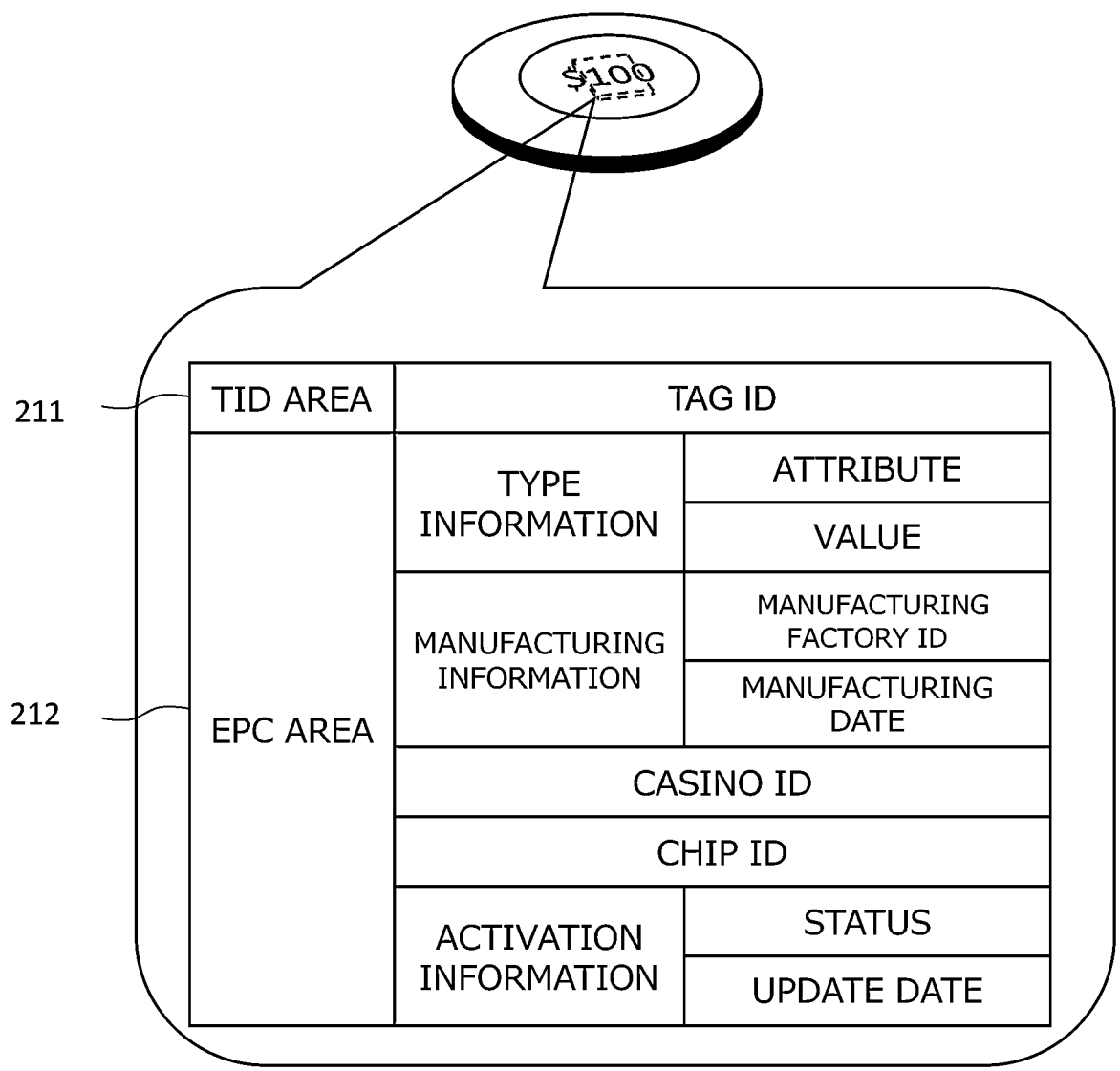
FIG. 3 shows information stored in an RFID tag of the gaming chip according to the first embodiment of the present invention.

FIG. 3 shows information stored in an RFID tag of the gaming chip according to the first embodiment of the present invention. As shown in FIG. 3, the RFID tag 721 has, as storage areas, a TID area 211 that stores tag identification information granted by the manufacturer of the RFID tag 721 (RFID tag manufacturing factory 100), and an EPC area 212 that stores item identification information granted by the manufacturer of the gaming chip 72 that incorporates the RFID tag 721 (chip manufacturing factory 200). In the TID area 211, the tag identification information is stored by the RFID tag manufacturing factory 100 that manufactures the RFID tag 721, and in the EPC area 212, and in the EPC area 212, the item identification information is stored by the chip manufacturing factory 200 that manufactures the gaming chip 72.

The tag ID unique to the RFID tag 721 is stored in the TID area 211 as tag identification information, and the chip ID unique to the gaming chip 72 is stored in the EPC area 212 as item identification information. The tag ID and the chip ID can each be used alone as identification information to identify the gaming chip 72, or a combination of the tag ID and the chip ID can be used as identification information. In addition to the chip ID, the EPC area 212 stores the attributes of the gaming chip (whether it is a non-redeemable NN chip or a redeemable cash chip) and its value ($10, $100, $1,000, etc.) as the type information, and the manufacturing information, which identifies the manufacturing factory that manufactured the gaming chip 72. The manufacturing factory ID, manufacturing facility ID, and the date of manufacture are stored as the manufacturing information, the casino ID is stored to identify the casino where the gaming chip 72 is used, and the status ("usable" or "unusable") and its update date are stored as the activation information. In addition, the status ("usable" or "unusable") and its update date are stored as activation information. In addition, the status ("usable" or "unusable") and its update date are stored as activation information. Here, "usable" means it is allowed to be used in the casino and "unusable" means it is not allowed to be used in the casino.

The status may be represented by a flag. In this case, the status is interpreted as "usable" when the flag is present, and "unusable" when the flag is not present. The status of "unusable" may be further subdivided. For example, "unusable" may include the statuses of "suspect", "caution required", "cancellation candidate", etc., which are used when there is a suspicion of an illegal chip. In addition, some or all of the type information, manufacturing information, casino ID, chip ID (item identification information), and activation information may be stored in the user area of the RFID tag 721, which is not shown, instead of in the EPC area 212.

In order to manufacture a gaming chip 72 that incorporates an RFID tag 721 at the chip manufacturing factory 200, an RFID tag 721 is first manufactured at the RFID tag manufacturing factory 100, where the tag identification information to identify the RFID tag 721 is written in the TID area 211 of the RFID tag 72. The RFID tag 72 manufactured at the RFID tag manufacturing factory 100 is provided to the chip manufacturing factory 200. At the chip manufacturing plant 200, the gaming chip 72 that incorporates the RFID tag 721 is manufactured. In the chip manufacturing factory 200, the chip ID and other information (see FIG. 3) are written in the EPC area 212 of the RFID tag 721.

At the chip manufacturing factory 200, in parallel with the manufacture of the gaming chip 72, the combination of the tag ID and chip ID (hereinafter, the tag ID and chip ID are collectively referred to as "identification information") is recorded in a data file 73. The chip manufacturing factory 200 prepares a data file 73 in which the tag ID and chip ID are recorded. The chip manufacturing factory 200 supplies the manufactured gaming chips 72 to the casino 300 and also provides the data file 73 to the casino 300 through a different route. The data file 73 may be sent from the manufacturer of the gaming chip 72 to the casino 300 by e-mail, or may be recorded on a portable storage medium and handed over from the manufacturer of the gaming chip 72 to the casino 300, or may be stored in a cloud storage by the manufacturer of the gaming chip 72 and downloaded by the casino 300. At this time, the data file 73 is provided from the chip manufacturing factory 200 to the casino 300 in an encrypted state using an appropriate method.

The casino 300 has a security area 301 where players 74 are not allowed to enter, and a floor area 302 where players 74 play games. The security area 301 has a warehouse 31 for storing gaming items including gaming chips 72, a procedure room 32 for registering and activating gaming chips 72, and a cashier 33 and a bank 34 leading to the floor area 302.

The cashier 33 has a window leading to the floor area 302. The cashier 33 gives gaming chips 72 to the player 74 in the floor area 302 in exchange for cash, and gives cash to the player 74 in exchange for gaming chips 72 given by the player 74 in the floor area 302. In other words, the player 74 can purchase gaming chips 72 with cash through the window of the cashier 33 and can have the gaming chips 72 exchanged for cash.

The bank 34 fills and credits gaming chips 72 to and from the pit 35. In fill, the bank 34 supplies gaming chips to the pit 35 when the pit 35 has insufficient gaming chips to supply the table 36. In credit, gaming chips 72 are returned from pit 35 to bank 34 when there are enough gaming chips 72 in pit 35. For this purpose, the bank 34 is equipped with a passageway or window to transfer gaming chips 72 to and from the floor area 302. In the case of fills, the gaming chips 72 may be supplied directly from the bank 34 to the table 36 without going through the pit 35, and in the case of credits, the gaming chips 72 may be returned from the table 36 to the bank 34 without going through the pit 35.

The gaming chips 72 supplied to the casino 300 from the chip manufacturing factory 200 are first stored in the warehouse 31 in the security area 301. In the procedure room 32, the registration and activation procedures are performed on the gaming chips stored in the warehouse 31. After the registration and activation procedures, the gaming chips are brought to the floor area 302 via the cashier 33 or the bank 34. The gaming chips 72 that have undergone the registration and activation procedures may be stored in the warehouse 31 and provided from the warehouse 31 to the cashier 33 or the bank 34, or they may be stored in the warehouse 31 and provided from the warehouse 31 to the cashier 33 or the bank 34 after only the registration procedures have been completed. The activation procedure may be performed when the product is provided from the warehouse to the cashier 33 or the bank 34.

A player 74 may purchase gaming chips 72 at cashier 33 or table 36. The player 74 bets the gaming chips 72 in the game played at the table 36, and if he/she wins the game, the dealer 75 redeems the gaming chips 72, and if he/she loses the game, the dealer 75 collects the gaming chips 72 he/she bet. In this way, the gaming chips 72 owned by the dealer 75 at the table 36 increase or decrease depending on the game results. When there is a shortage of gaming chips 72 at the table 36, gaming chips 72 are replenished from pit 35 to the table 36, and when there is an excess of gaming chips 72 at the table 36, gaming chips 72 are moved from the table 36 to the pit 35. Players 74 can also enter and exit the floor area 302 through the gate 38. In some casinos, players are allowed to enter and exit the floor area 302 with gaming chips 72 in their possession.

The warehouse 31, the procedure room 32, the cashier 33, the bank 34, each pit 35, each table 36, and the gate 38 in the casino 300 are all locations that handle gaming chips 72 as casino item, and are hereinafter collectively referred to as casino item handling locations. The gaming chips 72 reside in one of the casino item handling locations in the casino 300, or are otherwise owned by the player.

The above mentioned registration device 325, a central verification device 323, a cashier verification device 333, a bank verification device 343, a pit verification device 353, and a table verification device 363 all comprise a processor that performs information processing and a memory that stores a program to be executed by the processor. The program may be provided to the computing system via a non-transitory storage medium, or may be provided to the computing system via a network.

Figure 4:
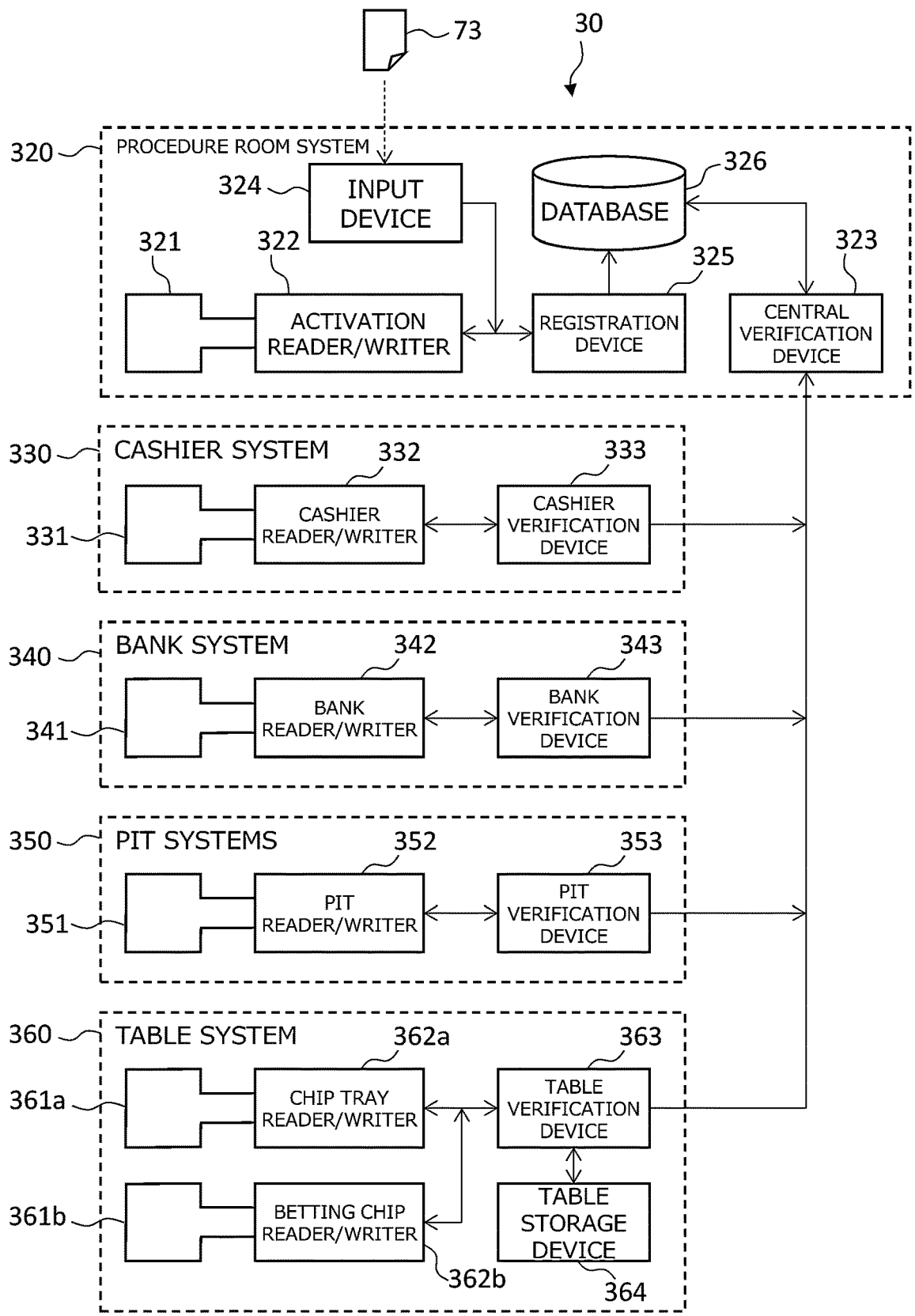
FIG. 4 shows an overall structure of the casino system according to the first embodiment of the present invention.

FIG. 4 shows an overall structure of the casino system according to the first embodiment of the present invention. The casino system 30 includes a procedure room system 320 provided in the procedure room 32, a cashier system 330 provided in the cashier 33, a bank system 340 provided in the bank 34, a pit system 350 provided in each pit 35, and a table system 3 provided in each table 36.

These procedure room systems 320, the cashier systems 330, the bank system 340, the pit systems 350, and the table systems 360 are communicatively connected to each other. The communication between these systems may be wired or wireless. Thus, the casino system 30 is a network system with a plurality of subsystems (i.e., the procedure room system 320, the cashier system 330, the bank system 340, the pit system 350, and the table system 360) installed at each casino item handling location.

The procedure room system 320 includes an antenna 321 and an activation reader/writer 322 for reading the RFID tag 721 embedded in the gaming chip 72 brought into the procedure room 32, and an activation reader/writer 322 for verifying whether the gaming chip 72 of each casino item handling location is registered or not, whether it is activated or not, an input device 324 for inputting data, a registration device 325 for registering and activating the gaming chip 72, and a database 326 as a storage device for storing the information of each gaming chip 72 including identification information and status.

The cashier system 330 includes an antenna 331 and cashier reader/writer 332 are used to read the RFID tag 721 of the gaming chip 72, which is taken out from the cashier 33 to the floor area 302 (purchased by the player), and a cashier verification device 333 used to verify the gaming chip 72 using the information read by the cashier reader/writer 332.

The bank system 340 is equipped with an antenna 341 and a bank reader/writer 342 for reading the RFID tag 721 of the gaming chip 72 brought into the bank 34 or taken out from the bank 34 to the floor area 302, and a bank verification device 343 for verifying the gaming chip 72 using information read by the bank reader/writer 342.

The pit system 350 has an antenna 351 and a pit reader/writer 35 for reading the RFID tag 721 of the gaming chip 72 brought into the pit 350 from the table 36 or the bank 34 or taken out of the pit 350 to the table 36 or the bank 34, and a pit verification device 353 for verifying the gaming chip 72 using the information read by the pit reader/writer 352.

The table 36 is provided with a chip tray or storage tray or chip float (hereinafter simply referred to as "chip tray") for storing the dealer's gaming chips 72. The table 36 is also provided with a betting area for betting the gaming chips 72 for each player position. The table system 360 includes an antenna 361a and a chip tray reader/writer 362a provided on the chip tray to read the RFID tags 721 of the gaming chips 72 contained in the chip tray, and an antenna 361a and a chip tray reader/writer 362a provided on the chip tray to read the RFID tags 721 of the gaming chips 72 placed (bet on) in the betting area of the table 36.

The table system 360 further comprises a table verification device 363 for verifying the gaming chips 72 using the information read by the chip tray reader/writer 362a and the betting chip reader/writer 362b, and a chip tray reader/writer 362a and a betting chip reader/writer 362b, a table storage device 364 that stores the information read by the chip tray reader/writer 362a and the betting chip reader/writer 362b. The gate 38 may also be provided with a gate system similar to each of the above subsystems.

Registration and Activation

The registration and activation procedures performed in the procedure room 32 are described below. The gaming chips 72 manufactured in the chip manufacturing factory 200 are brought to the security area 301 of the casino 300 and stored in the warehouse 31. In the procedure room 32, the gaming chip 72 to be registered, which is stored in the warehouse 31, is taken out and the procedure for registration and activation of the gaming chip 72 is performed using the procedure room system 320.

A data file 73 containing identification information is provided to the procedure room system 320 by the chip manufacturing factory 200 (manufacturer of the gaming chip 72), and the procedure room system 320 receives the data file 73 at the input device 324. Since the data file 73 is encrypted, the input device 324 decrypts the data file 73. In addition to the identification information, some or all of the other information stored in the RFID tag 721 of each gaming chip 72 (see FIG. 3) may also be recorded in this data file 73.

The antenna 321 and the activation reader/writer 322 read the tag ID and the chip ID, which are identification information, from the RFID tag 721 of the gaming chip 72 to be activated. The registration device 325 determines (verifies) whether or not the identification information read by the activation reader/writer 322 from the gaming chip 72 exists in the identification information stored in the data file 73 decoded by the input device 324. In other words, the registration device 325 determines whether each of the gaming chips 72 is a genuine one formally manufactured at the chip manufacturing factory 200, or a fake one not formally manufactured at the chip manufacturing factory 200, or one in which the RFID tag 721 has failed (validation). In other words, the registration device 325 determines the authenticity of the gaming chip 72 based on whether or not the identification information stored in the RFID tag 721 of the gaming chip 72 matches the identification information stored in the data file 73.

If the registration device 325 determines that the gaming chip 72 is genuine in the authenticity determination, it registers the gaming chip 72 by recording its identification information (the tag ID and the chip ID) in the database 326. At this time, if other information such as manufacturing information is recorded in the RFID tag 721 and/or the data file 73 of the gaming chip 72, such information is also recorded in the database 326 in association with the identification information. Furthermore, the registration device 325 records the activation information of each gaming chip 72 in the database 326.

Instead of or in addition to the above validation at the casino, the validation may be performed at the chip manufacturing factory 200. In this case, the registration device 325 registers the gaming chips 72 that have been validated and determined to be genuine at the chip manufacturing factory 200.

Thus, the creation of a new record of the gaming chip 72 in the database 326 by the registration device 325 is referred to herein as "registration", and the making usable of the activation status of the registered gaming chip is referred to herein as "activation". In this embodiment, when registering the gaming chip 72, an authenticity check is performed to confirm whether the gaming chip 72 is a genuine one that has been officially manufactured at the chip manufacturing factory 200. This authenticity check is referred to as "first validation," and checking the information read from the RFID tag 721 of the gaming chip 72 at each casino item handling location against the database 326 is referred to as "validation". In this system, the first validation, the registration, and the activation are performed at the same time. "Deactivation" as described below refers to making the activation status unusable without deleting the registration (leaving the record of the relevant gaming chip 72 in the database 326). "Reactivation" refers to the process of re-activating a gaming chip 72 that has been deactivated once.

Figure 5:
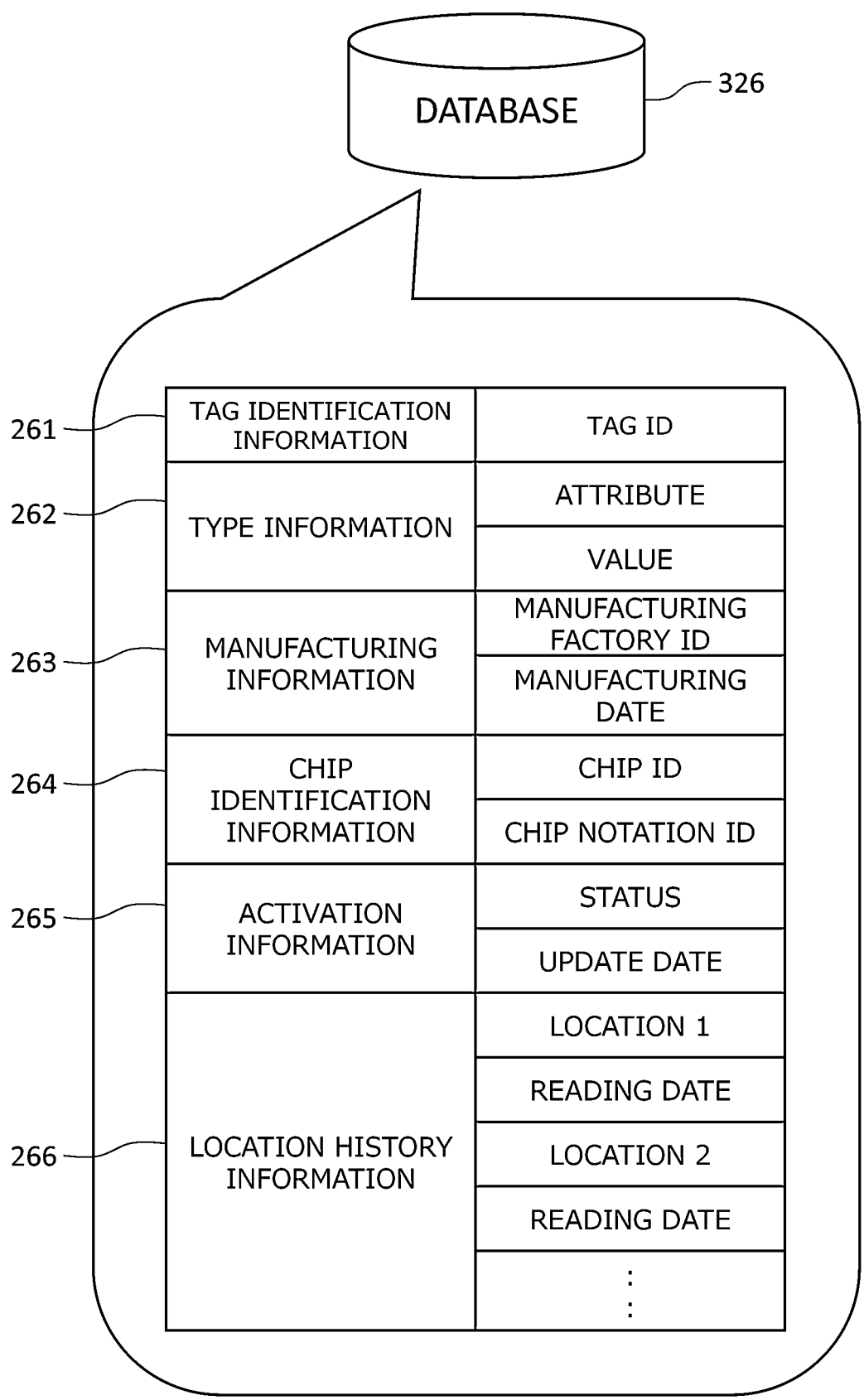
FIG. 5 shows data structure of information of each gaming chip recorded in the database according to the first embodiment of the present invention.

FIG. 5 shows data structure of information of each gaming chip recorded in the database according to the first embodiment of the present invention. In this embodiment, the database 326 contains, for each gaming chip 72, the tag ID as the tag identification information 261, the attribute and value as the type information 262, the manufacturing factory ID and the manufacturing date as the manufacturing information and 263, the chip ID and the chip notation ID as the chip identification information 264, and the activation status and update date and time as the activation information 265, and the history of the combination of location and read date and time as the location history information 266. The database 326 has a look-up table (LUT) that records the information of multiple gaming chips 72, in which each gaming chip 72 shown in FIG. 5 is recorded as one record. This LUT is a list of identification information.

When registering a new gaming chip 72, the registration device 325 checks whether the identification information that is about to be registered has already been registered in the database 326. This prevents the same identification information from being registered in the database 326 in duplicate. The registration device 35 may update the status from unusable to usable during the deactivation described below, i.e., when the predetermined conditions are met after the status is made unusable with the record remaining.

The registration device 325 stores the identification information of the gaming chip 72 that meets the predetermined conditions (e.g., the gaming chip 72 to be discarded) among the gaming chips 72 that have undergone the cancellation process in the database 326 as an identification information that cannot be registered, and when making a new registration, the registration may be prohibited if the identification information of the gaming chip 72 is stored in the database 326 as the identification information that cannot be registered. For example, if the registration device 325 erases the record of a certain gaming chip 72 from the database 326, the database 326 may have a black list that stores the identification information of the gaming chip whose record was erased. In this case, the registration device 325, when registering, checks whether the identification information to be registered is stored in the black list, and prohibits registration for the identification information in the black list. This prevents identification information that has once been deleted from the database from being newly registered again.

When the registration device 325 registers the identification information read by the activation reader/writer 322 for the gaming chip 72 that has been successfully verified and determined to be genuine in the database 326, it records the status of the activation information 265 as "usable" and the date and time at that time as the update date and time. When the identification information read by the activation reader/writer 322 is registered in the database 326, the status of the activation information 265 is recorded as "usable," and the date and time of the update are recorded as the update date and time, thereby registering the gaming chip 72 as usable. This allows the user to determine whether the status of each gaming chip 72 is "usable" or "unusable" by referring to the database 326, and also to know when the activation was performed (when it was registered).

In this embodiment, since the activation information is also recorded in the EPC area 212 of the RFID 721 of the gaming chip 72, the registration device 325 controls the writer function of the activation reader/writer 322 as a process of registering the usable gaming chip 72. The status recorded in the RFID tag 721 of the gaming chip 72 that has been successfully verified and determined to be genuine is rewritten from "unusable" to "usable" via the antenna 321. As a result, the systems 330-360 at each casino item handling location can know whether the status of the gaming chip 72 in question is "usable" or "unusable" simply by reading the RFID tag 721 of the gaming chip 72.

As described above, after the gaming chip 72 is transported from the chip manufacturing factory 200 to the casino 300, it is registered in the database 326 by the registration device 325. Even if the gaming chip 72 is stolen in the process of transportation, the gaming chip 72 so stolen will not be registered in the database 326 and can be found to be unregistered in the verification described below. Therefore, such gaming chips 72 cannot be validly used in the floor area 302 of the casino 300. The casino only needs to strictly manage the gaming chip 72 after it is made usable through the activation procedure, which allows for a higher level of security and lower security costs compared to the case where the gaming chip 72 must be strictly managed from the time it is manufactured.

In the above, example, when activating the gaming chip 72, the activation was performed by creating a new record of the gaming chip 72 in the database 326 and setting its status to "usable". Alternatively, the registration device 325 may register a newly received gaming chip 72 by creating a record of the chip in the database 326, setting its status as "unusable" at this time, and then rewriting the status to "usable" through a subsequent activation procedure. In this case, the creation of the record is called registration, and the rewriting of the status to "usable" is called activation.

Verification at the Casino Item Handling Location

The cashier system 330, the bank system 340, the pit system 350, and the table system 360 at the cashier 33, the bank 34, the pit 35, and the table 36, which are casino item handling locations, respectively, perform verification of the identification information and check of the status of the gaming chip 72 handled there. The following is a description of each casino item handling location.

At the cashier 33, the antenna 331 and the cashier reader/writer 332 of the cashier system 330 read the RFID tag 721 of the gaming chip 72 in the cashier 33 to obtain the tag ID, chip ID, and the status. The cashier verification device 333 outputs an error signal indicating that the status read from the RFID tag 721 of the gaming chip 72 is "unusable". When the error signal is output, the cashier 33 shall stop handling the gaming chip 72.

The cashier verification device 333 further transmits the identification information (the tag ID and the chip ID) acquired by the cashier reader/writer 332 to the procedure room system 320. The central verification device 323 in the procedure room 32 verifies that the identification information received from the cashier system 330 is stored in the database 326 and that the status associated with the identification information is usable.

If the corresponding identification is stored in the database 326 (i.e., is genuine) and its status is usable, the central verification device 323 sends a response signal to the cashier system 330 to that effect for the gaming chip 72 as genuine and usable. On the other hand, if the inquired gaming chip 72 is not genuine, the central verification device 323 sends an error signal as a response signal to the cashier system 330 to the effect that it is not genuine, and if the inquired gaming chip 72 is genuine but its status is unusable, the central verification device 323 sends an error signal as a response signal to the cashier system 330 to the effect that it is genuine but unusable. Upon receiving the response signal, the cashier verification device 333 may issue an alert, which may be perceived only by the staff or by many persons, including the player. Note that the response signal may also be returned to the cashier system 330 if it is genuine and usable, in which case the cashier verification device 333 may report that there is no problem or that it has "passed".

If there is a gaming chip 72 whose status read from the RFID tag 721 of the gaming chip 72 is usable by the cashier verification device 333 but whose status is recorded as unusable in the database 326, the cashier verification device 333 determines that the gaming chip 72 is counterfeit, and controls the writer function of the cashier reader/writer 332 to rewrite the status of the RFID tag 721 of the gaming chip 72 to "unusable" via the antenna 331. Alternatively, the cashier verification device 33 may rewrite the status to "unknown" or "suspect".

If the status is recorded as "usable" in the database 326, but the status read from the RFID tag 721 of the gaming chip 72 by the cashier verification device 333 is "unusable," then it is determined that such gaming chip 72 may, for some reason, have been rewritten the status stored in the RFID tag 721 of the gaming chip 72, and the status stored in the RFID tag 721 of the gaming chip 72 can be rewritten to "usable". Alternatively, the status of such a gaming chip 72 may be rewritten as "unusable" or "unknown" or "suspicious" and its handling may be discontinued.

The gaming chip 72 that is brought into the cashier 33 directly from the procedure room 32 or through the warehouse 31 has already been registered and activated in the procedure room 32 and has not left the security area 301, so it is unlikely that it is a counterfeit or illegal gaming chip. However, there is a possibility that a counterfeit or fraudulent gaming chip 72 may be present among the gaming chips 72 that are brought into the cashier 33 by the user from the floor area 302 to be redeemed. Therefore, the cashier verification device 333 may, among other things, verify the identification and the status of the gaming chips 72 to be redeemed and indicate the results to the player 74 and the staff of the cashier 33. Alternatively, when a player 74 purchases a gaming chip 72, the information on the value stored in the RFID tag 721 of the gaming chip 72 is read and presented to the player 74, the identification information and the status are also checked at the same time, and the results are presented to the player 74 together with the information on the value.

The bank system 340 operates basically in the same way as the cashier system 330. The gaming chips 72 to be filled will be transported from the bank 34 to the pit 35 in the floor area 302, but it is unlikely that counterfeit or fraudulent gaming chips 72 will be mixed in, since such gaming chips 72 have been activated in the processing room 32 and have not left the security area 301. However, the gaming chips 72 that are brought into the bank 34 from the floor area 302 during the credit process include those that have been collected by the dealer after being handed over to the player 74. Therefore, there is a possibility that counterfeit or fraudulent gaming chips 72 may be mixed in. Therefore, the bank system 340 may check the identification and the status of the gaming chips 72 brought in from the floor area 302, among others.

The pit system 350 basically operates in the same way as the cashier system 330. In the pit 35, gaming chips 72 that are filled from the bank 34 and the gaming chips 72 that are in excess at the table 36 are brought in. The pit system 350 checks the gaming chips 72 that are brought into the pit 35 in this way. Excess gaming chips 72 in the pit 35 are moved to bank 34 (credit), or gaming chips 72 are replenished from the pit 35 to the table 36 if there is a shortage of gaming chips 72 at the table 36. The pit system 350 will also check the gaming chips 72 leaving the pit 35 in this way.

The operation of the table system 360 is as follows. At the table 36, the dealer 75 redeems gaming chips 72 from the chip tray to the player 74 who won the game. An antenna 361a is provided on the chip tray, and the chip tray reader/writer 362a reads the identification information and the status from the RFID tag 721 of the gaming chip 72 contained in the chip tray. The identification information read by the chip tray reader/writer 362a is checked by the table verification device 363 and stored in the table storage device 364. When a plurality of gaming chips 72 are housed in the chip tray, a plurality of identification information corresponding to the plurality of gaming chips 72 will be stored in the table storage device 364.

The table verification device 363 first compares the most recent identification information stored in the table storage device 364 in the past with the current identification information read by the chip tray reader/writer 362a to determine whether the two match.

If there is any identification information among the identification information read by the chip tray reader/writer 362a that is not among the latest identification information stored in the table storage device 364, the table verification device 363 may, in the same manner as the cashier verification device 333 described above, for such gaming chip 72, determine whether such identification information is stored in the database 326 and whether the status corresponding to such identification information is "usable" in the database.

Specifically, the table verification device 363 normally verifies the chip ID read from the RFID tag 721 of the gaming chip 72 with the previous chip ID registered in the table storage device 364. When a new chip ID that was not read in the previous reading is read, the identification information including the tag ID read from the RFID tag 721 of the gaming chip 72 is checked against the identification information including the tag ID recorded in the database 326 and the status is checked.

Figure 6:
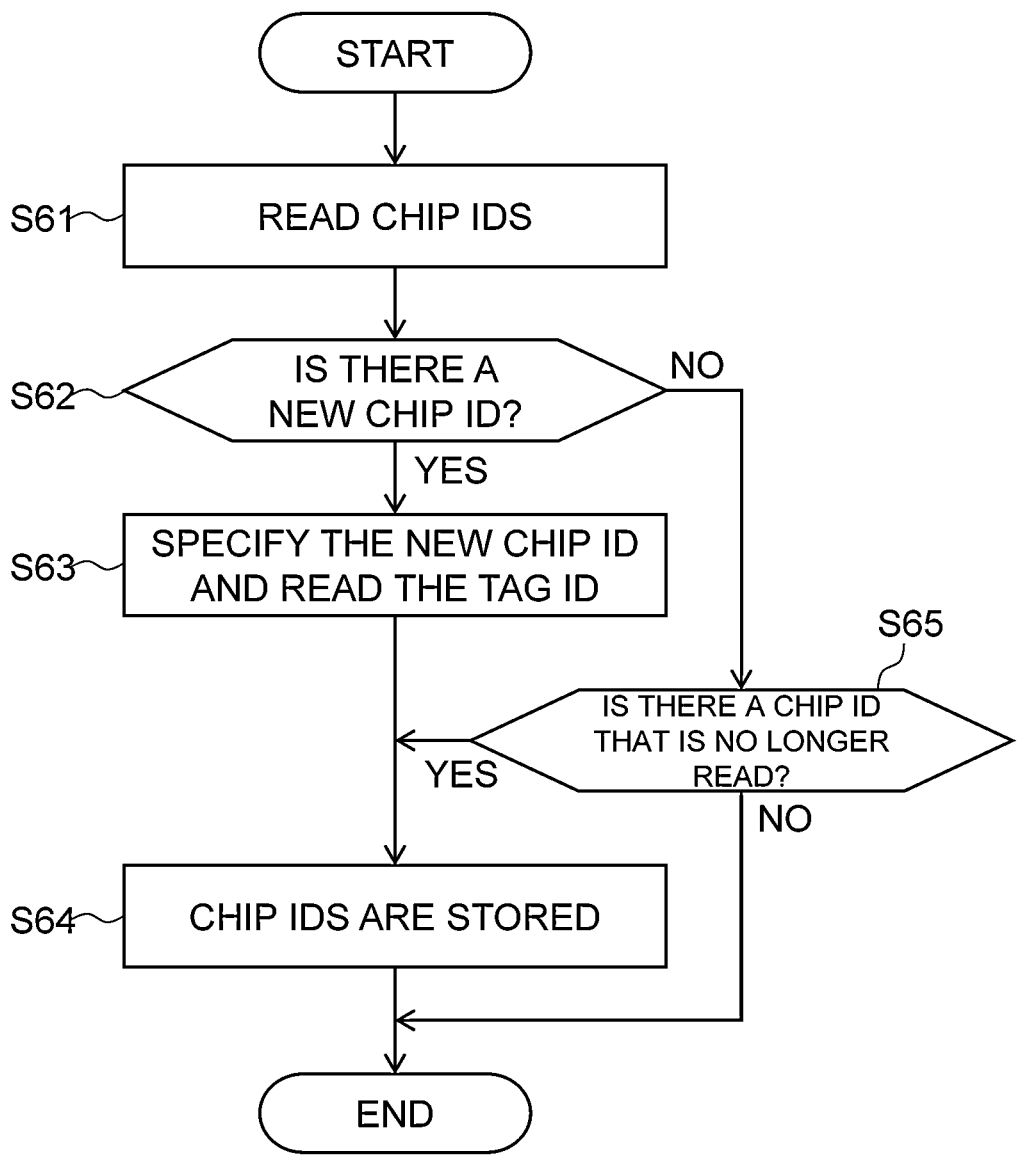
FIG. 6 shows a flowchart of an operation of a table system according to the first embodiment of the present invention.

FIG. 6 shows a flowchart of an operation of a table system according to the first embodiment of the present invention. The antenna 361a and the chip tray reader/writer 362a read the chip IDs from the RFID tags 721 of all gaming chips 72 in the chip tray (step S61). The table verification device 363 checks a group of these read chip IDs against the group of chip IDs stored in the table storage device 364 as the latest chip IDs in the past, and determines whether there are new chip IDs among the read chip IDs that are not stored in the table storage device 364. In this way, the system is able to determine whether there is a new chip ID among the read chip IDs that is not stored in the table storage device 364.

If a new chip ID is read (YES in step S62), the antenna 361a and the chip tray reader/writer 362a specify the new chip ID, read the tag ID from the RFID tag 721 of the gaming chip 72 having the new chip ID, and read the combination of the chip ID and the tag ID. The combination of the chip ID and the tag ID is sent to the procedure room system 320 to be checked against the information stored in the database 326 and to confirm whether the status is "usable" (step S63). Then, the group of the all read chip IDs is stored in the table storage device 364 as a group of new latest read chip IDs in the past (Step S64).

If no new chip IDs are read, that is, if no new gaming chips 72 have been added to the chip tray since the previous reading, the table verification device 363 does not compare the group of chip IDs read with the group of the latest chip IDs in the past stored in the table storage device 364. In the comparison, it is determined whether or not there is a chip ID that was read in the previous reading but is no longer read in the current reading (step S65).

If there is a chip ID that is no longer read, i.e., if the gaming chip 72 is taken out of the chip tray (YES in step S65), a group of the all read chip IDs is stored in the table storage device 364 as a group of the latest chip IDs in the past (step S64). On the other hand, if there are no chip IDs that are no longer read (NO in step S65), that is, if there has been no increase or decrease or change of gaming chips 72 in the chip tray, the table storage 364 is not updated.

Thus, in the chip tray of the table 36, the chip ID stored in the EPC area 212 is usually read at predetermined time intervals and the variation thereof is monitored, and when there is a variation in the chip ID, especially when a new chip ID is read, the gaming chip 72 with the new chip ID is checked against the database 326 and the status of the database 326 is checked. Therefore, the processing load can be reduced and the processing time required for one cycle can be shortened (the processing speed can be improved).

The table verification device 363 may perform the verification with the database 326 and the check of the status of the database 326 at a predetermined timing and/or under a predetermined condition, regardless of whether or not there is a newly read chip ID.

When a player 74 places a bet on a game, the player 74 places the gaming chip 72 to be bet on at a predetermined betting area on the game table. The antenna 361b is placed under the betting area on the table surface of the game table, and the betting chip reader/writer 362b reads the identification information from the RFID tag 721 of the betting gaming chip 72. The identification information read by the betting chip reader/writer 362b is checked by the table verification device 363 and stored in the table storage device 364. When a plurality of gaming chips 72 are bet in the betting area, a plurality of identification information corresponding to the plurality of gaming chips 72 is stored in the table storage device 364.

The antenna 361b and the betting chip reader/writer 362b read the RFID tags 721 of the gaming chips 72 that have been paid out from the chip tray by the dealer 75 as well as the gaming chips 72 that have been bet in the betting area by the player 74, and the table storage device 364 also stores the identification information of gaming chips 72 that are so paid out.

The table verification device 363 checks the status and verifies the identification information read from the RFID tag 721 by the betting chip reader/writer 362b in the same manner as for the gaming chips 72 contained in the chip tray. Specifically, the table verification device 363 does not always check the identification information read by the betting chip reader/writer 362b against the database 326, but instead when new identification information that is not in the latest identification information stored in the table storage device 364 as having been read from the betting chip reader/writer 362b is read by the antenna 361b and the betting chip reader/writer 362b, the identification information is checked against the identification information stored in the database 326 and the status stored in the database 326 is checked via the central verification device 323.

In particular, when the table verification device 363 receives a response signal from the central verification device 323 as a result of the verification to the effect that it is not genuine or unusable, an alert is issued, and the dealer takes action on the spot to prevent the use of gaming chips 72 that are unauthorized or unusable, and such a gaming chip 72 can be collected from the player. For example, if a gaming chip 72 bet by a player is read by the betting chip reader/writer 36 and its status is found to be unusable, the dealer can collect the gaming chip 72 before the game starts and distinguish it from other usable gaming chips 72 for later disposal. Or, if some of the chips collected in the chip float are unusable in status, they can be stored separately for later processing according to the alert.

In the verification of the first embodiment described above, at each casino item handling location, the information read from the RFID tag 72 of the gaming chip 72 is transmitted to the central verification device 323 of the procedure room system 32, and the central verification device 323 checks the data in the database 326 of the procedure room system 320. The information read from the RFID tag 72 of the gaming chip 72 was sent to the central verification device 323 of the procedure room system 32. In other words, the information on the gaming chip 72 was centrally managed in the database 326 of the procedure room system 320. Alternatively, the subsystems 330, 340, 350, and 360 of each casino item handling location may be able to perform the verification without communicating with the procedure room system 320.

In this case, each subsystem 330, 340, 350, 360 is all equipped with a database. In this case, each subsystem 330, 340, 350, and 360 may be configured as an integrated device, including the database. Furthermore, the device may be a portable device, not fixed to each casino item handling location, and may even be battery powered. Thus, if the subsystems 330, 340, 350, and 360 of each casino item handling location are used in a stand-alone manner, they may not be able to share such information with other casino item handling locations in the event of fraudulent or suspected chips, but at the very least, the information can be cross-checked with the database provided at each casino item handling location. In other words, it is at least possible to determine whether or not the identification information of the gaming chip 72 is registered in the database.

In this case, each table 36 may use the chip tray reader/writer 362a or betting chip reader/writer 362b described above, to perform the above verification, but apart from these readers/writers, a dedicated reader may be prepared to perform the verification with the local database.

In this case, each subsystem may be equipped with a configuration to determine the number of gaming chips 72 whose RFID tags 721 are read by the antenna. Such a configuration may be, for example, a configuration in which the holding means for holding the gaming chips 72 from which the RFID tags 721 are read can accommodate a predetermined number of gaming chips 72 (e.g., 20 or 100). The holding means may be, for example, a chip-holding mechanism having a half-tube shape that can accommodate a predetermined number of gaming chips 72 in a stack, or a gaming chip table having a predetermined number of chip-placement areas where a predetermined number of gaming chips 72 are placed one by one. In this case, the verification devices 333, 343, 353, and 363 inspect the gaming chips 72 by comparing the number of readings of the RFID tags 721 with the maximum number of chips, assuming that the maximum number of gaming chips 72 that can be held in those holding means is actually held.

The configuration for determining the number of gaming chips 72 may be optical detection means that optically detects the gaming chips 72 from which the RFID tags 721 are read. The optical detection means may be an optical sensor that detects the gaming chips 72 on which the RFID tag 721 is read one by one, or it may comprise a camera that captures the gaming chips 72 on which the RFID tag 721 is read and generates an image, and an image analyzer that determines the number of gaming chips 72 by analyzing the image. The verification devices 333, 343, 353, and 363 of each subsystem may then inspect the gaming chips 72 by comparing the number of RFID tags 721 read and the actual number of gaming chips 72 optically determined.

Each of the subsystems 330, 340, 350, 360 may be equipped with a display device. In this case, the display device may show all the values of each gaming chip 72 stored in the RFID tag 721 read by each reader/writer, or may show the total value of the plurality of gaming chips 72 read by each reader/writer. Alternatively, the display device may show the result of the comparison between the number of RFID tags 721 and the actual number of chips as the result of the verification.

In this way, it may be possible to perform inspections by comparing the information read from the RFID tags 721 with the database, and by comparing the number of RFID tags 721 read with the number of tags optically determined. In particular, by having a database in each of the subsystems 330, 340, 350, and 360, these two types of inspections can be performed simultaneously at each casino item handling location without the need for communication with the network.

In this case, the database for each table may be updated periodically (e.g., once a week) or at the time when new gaming chips 72 are introduced to the casino. When making this update, the database 326 of the procedure room system 360 may be updated, and at the same time, the database of each subsystem 330, 340, 350, 360 may be updated remotely by communicating from the procedure room system 320 to each subsystem 330, 340, 350, 360. Alternatively, when updating, the database of each subsystem 330, 340, 350, 360 may be updated by storing the updated data in a portable storage medium and reading the updated data from this storage medium in each subsystem 330, 340, 350, 360.

It may also be possible to switch between the method of centralized management by the database 326 of the procedure room system 320 and verification by communication as described above (network-based method) and the method of stand-alone verification in each subsystem 330, 340, 350, 360 (stand-alone method). For example, verification may be performed using the network-based method under normal circumstances, and switched to the stand-alone method in the event of a power failure or other trouble. Also, whenever there is an update to the information in the database, the database of each subsystem 330, 340, 350, and 360 is updated in real time using the network, but the verification may only be done using the database of each subsystem 330, 340, 350, and 360.

Tracking of Gaming Chips

As described above, the information for each gaming chip 72 in the database 326 includes location history information 266. Each time the central verification device 323 receives an inquiry request for identification information from each casino item handling location, it updates the location history information 266 corresponding to the identification information. Specifically, when the central verification device 323 receives an inquiry request for identification information from each casino item handling location, the central verification device 323 records information specifying the casino item handling location as the location information and the date and time of the inquiry as the reading date and time in the location history information 266 corresponding to the identification information. In the database, a predetermined number of information can be recorded as the location history information, and after the predetermined number of location history information is recorded, the old information is overwritten.

The location history information is the history of the location information. The location information is information that identifies each casino item handling location or each player. For example, if a cashier has more than one window, the window ID that identifies the window can be used as the location information, and if there are more than one pit and table, the pit ID and table ID that identify which pit and table are used can be used as the location information.

In addition, when the gaming chip 2 is given to a player 74, the player ID of the player 74 shall be recorded as the location information. For example, if antennas 361b are provided for each player position at the table 36, the player ID of each player position can be identified by the member card held by the player 74 or by facial recognition of the image of the player playing at the table 36.

Then, by detecting to which player position the gaming chip 72 to be paid out to a player is paid out, it can be determined to which player ID the gaming chip 72 has been paid out. In addition, when a player 74 purchases a gaming chip 72 at the cashier 33, the player ID of the player 74 is identified and the player ID is recorded as location information.

In this way, by recording the history of the location information and the information of the date and time of its reading in the database 326 as the location history information, it is possible to determine how the gaming chip 72 in question has been moved by referring to the database 326.

Deactivation

As described above, the registration device 325 registers and activates the gaming chip 72 in the database 326 by storing in the database 326 the respective information including the identification information of the new gaming chip 72 obtained from the factory. On the other hand, for malfunctioning or outdated gaming chips 72, the registration device 325 sets the status of the gaming chip 72 which has been set to usable once to unusable (cancellation process).

At each casino item handling station, the gaming chips 72 for which information cannot be read from the RFID tag 721 (i.e., gaming chips 72 for which the RFID tag 721 has been damaged or gaming chips 72 for which the RFID tag 721 is not embedded) shall be excluded from the gaming chips 72 that can be used on the spot. The gaming chips 72 that fail to verify the identification information read from the RFID tag 721 are also excluded from the gaming chips 72 that can be used in place. Furthermore, the gaming chips 72 whose status was unusable are also excluded. In addition, if fraud or suspected fraud is committed at a casino item handling location (especially at the table 36), the dealer will exclude the gaming chips 72 involved in the fraud or suspected fraud from the gaming chips 72 usable for use at the location. These problematic gaming chips 72 are brought from the respective casino item handling location to the procedure room 32, where the registration as usable gaming chip will be canceled.

A gaming chip 72 that has been excluded from the usable gaming chips 72 at the casino item handling location and brought into the procedure room 32 has its identification information read out from the gaming chip 72 by the activation reader/writer 322. The registration device 325 performs a cancellation process for the identification information read by the activation reader/writer 322.

Furthermore, for a gaming chip 72 that has been activated for a predetermined period of time (e.g., one year) from the date and time of the first activation without any problems, the cancellation process is performed in order to dispose of the gaming chip 72. In other words, as a credit process, in the bank 34, the bank reader 342 reads the identification information from the RFID tag 721 of the gaming chip 72 brought into the bank 34 from the pit 35, and requests a verification to the central verification device 323. At this time, the central verification device 323 checks the date and time of activation of the gaming chip 72 in question by referring to the database 326, and if more than a predetermined time has elapsed since the date and time, the registration device 325 performs the cancellation process for the gaming chip 72 in question. Similarly, in the cashier 33, the cashier reader/writer 332 reads the identification information from the RFID tag 721 of the gaming chip 72 brought into the cashier by the player to redeem the gaming chip 72, and requests a verification to the central verification unit 323. If more than a predetermined amount of time has elapsed since the date and time, the registration device 325 performs the cancellation process for the gaming chip 72.

The gaming chips 72 that have been brought into the bank 34 or cashier 33 and for which more than a predetermined amount of time has elapsed since the date and time of activation may be destroyed (destroys). For the destroyed gaming chip 72, the record may be deleted from the database 326, or the activation status may be set to "destroyed", a type of unusable, as a cancellation process while the record is retained. Subsequent registration of the identification information of the discarded gaming chip 72 may be prohibited, or subsequent updating of the activation status to "usable" may be prohibited for a gaming chip 72 whose activation status is "destroyed".

In the cancellation process, the registration device 325 shall update the status of such gaming chip 72 recorded in the database 326 to "invalidated" and record the date and time of the update. If the RFID tag 721 of the gaming chip 72 is malfunctioning, the identification information to be invalidated cannot be read from such gaming chip 72. Therefore, the registration device 325 cancel the registration of such gaming chip 72 as a usable gaming chip in the following manner.

Figure 7:
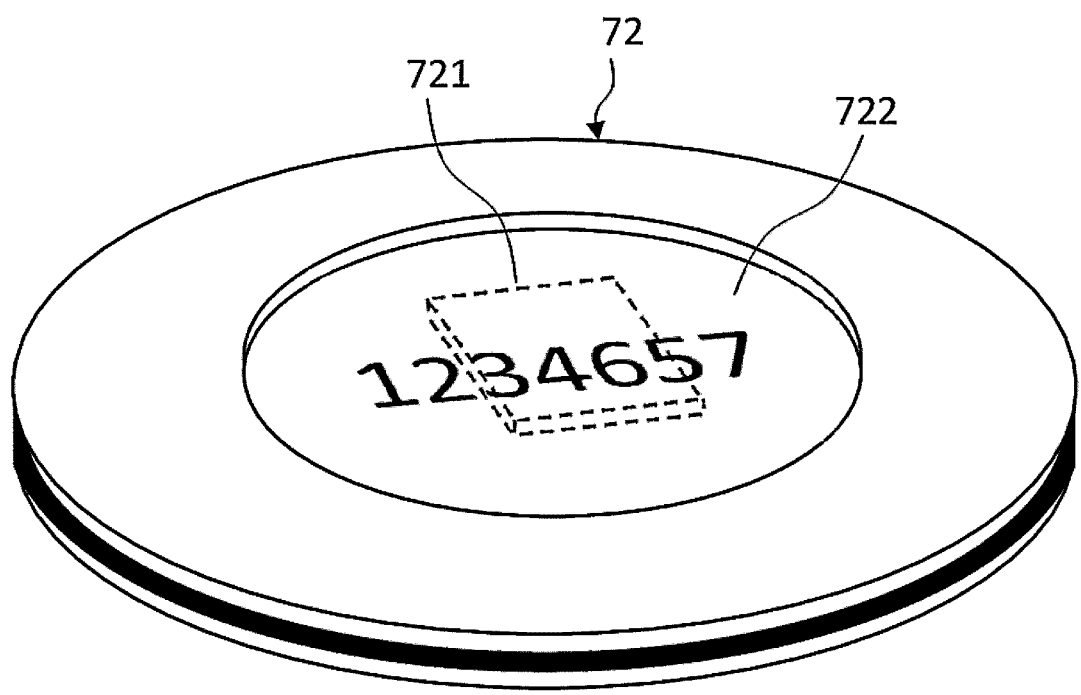
FIG. 7 shows a diagram of a gaming chip as a casino item (with a decal removed) according to the first embodiment of the present invention.

FIG. 7 shows a diagram of a gaming chip as a casino item (with a decal removed) according to the first embodiment of the present invention. The gaming chip 72 carries information for identifying the gaming chip 72 in a manner other than the RFID tag 721. The gaming chip 72 has a circular recess in the center, and a decal 723 is affixed to the bottom surface 722 of the recess. The number representing the value of the gaming chip 72 is written on this decal 723. When the decal is removed, the bottom of the recess (decal attachment surface) 722 has the chip notation ID as the unique identification information for the gaming chip 72. The chip notation ID may be written on the bottom surface 722 of the recess of the gaming chip 72 by laser engraving, or it may be printed on the decal attachment surface 722 with some type of ink. The chip notation ID may also be printed on the surface of the decal 723. In this case, the chip notation ID may be printed using visible ink or invisible ink that is invisible under normal conditions, such as UV emitting ink that emits light when irradiated with UV light or infrared absorbing ink that absorbs infrared light.

For the gaming chip 72 that cannot read the identification information from the RFID tag 721, the registration device 325 identifies the identification information that should be deregistered as a usable gaming chip 72 using the chip notation ID to identify the gaming chip 72, and performs the cancellation process. For the gaming chip 72 whose identification information cannot be read due to the failure of the RFID tag 721, the operator peels off the decal 723, sees the chip notation ID on the decal affixing surface 722, and inputs the chip notation ID to the registration device 325 via the input device 324. The registration device 325 refers to the database 326 to identify the identification information corresponding to the input chip notation ID (see FIG. 5). As a result, even for a gaming chip 72 whose RFID tag 721 has malfunctioned, the gaming chip 72 can be identified in the database 326 and the cancellation process can be performed.

As described above, the gaming chips 72 passed to the players 74 are passed back and forth among multiple players 74 and tables 36 by bets by the players 74 and payouts by the dealers 75, and are finally returned to the bank 34 via the pit 35. At this time, the gaming chips 72 that have been excluded at each casino item handling location as described above, are released by the registration device 325.

In addition, gaming chips 72 that have not been excluded as problematic and are collected in the bank 34 by the credit process are subjected to verification of identification information and status in the banking system 34 to determine whether a predetermined period of time has not elapsed since the initial activation. If the bank system detects gaming chips that have failed to verify the identification information, or whose status is not "usable," or if a predetermined period of time has elapsed since the first activation, the bank system will deactivate those chips.

In addition, as described above, the database 326 and the gaming chip 72 store the type information, manufacturing information, and casino ID in association with the identification information. When these information stored in the database 326 and these information stored in the gaming chip 72 do not match, the cancellation process may be performed for such gaming chip 72.

As for the gaming chips 72 that were not registered in the database 326 as a result of checking the read identification information against the database 326 at each casino item handling location, and the gaming chips 72 whose status was not "usable", it may be necessary to remove such gaming chips 72 from the security area 301. For the gaming chip 72 that have not been registered in the database 326 as a result of being checked against the database 326 or for the gaming chip 72 whose status is not "usable," the registration device 325 may immediately take steps to cancel the registration of such a gaming chip 72 as a usable gaming chips 72, without waiting for such a gaming chip 72 to return to the security area 301. The reader/writer at each casino item handling location may also rewrite the status of such gaming chip 72 to "unusable" if the status of such gaming chip 72 is "usable".

When the gaming chip 72 is read at each casino item handling location, the central verification device 323 may check the history of the location of the gaming chip 72 based on the information in the database 326. If the location history is inappropriate in light of the predetermined criteria, the central verification device 323 may set the status of the gaming chip 72 to unusable as a suspect gaming chip 72. For example, if the location history shows that the gaming chip 72 has been moved directly from one player 74 to another player 74 without passing through the chip tray 36a, the location history of the gaming chip 72 is determined to be suspicious (a possibility of money laundering). Alternatively, a list of suspicious gaming chips 72 (black list) may be created in advance in the database 326, and if the gaming chip 72 involved in the verification is listed in the black list, the registration device 325 may actually perform the cancellation process for the gaming chip 72 concerned.

As described above, in the chip tray of table 36, the chip tray reader/writer 362a periodically reads the RFID tag 721 of the gaming chip 72. In addition, at the table 36, the betting chip reader/writer 362b reads the RFID tag 721 of the gaming chip 72 paid from the chip tray. The gaming chips 72 in the chip tray are also moved to the pit 35 at the appropriate time. Therefore, gaming chips 72 that are no longer read in the chip tray should then be read by betting chip reader/writer 362b or pit reader/writer 352.

Therefore, the table verification device 363 stores the identification information that is no longer read by the chip tray reader/writer 362a in the table storage device 364, and then determines whether or not the identification information is read by the betting chip reader/writer 362b within a predetermined time (e.g., within 10 seconds). If the identification information is not read by the bet chip reader/writer 362b within the predetermined time, the table verification device 363 sends the time when the identification information is no longer read along with the identification information to the central verification device and inquires whether the identification information was read in the pit 35.

When the registration device 325 receives an inquiry, it checks whether the pit reader/writer 352 has reported the identification information concerned to the central verification device 323 within a predetermined time (e.g., within three minutes). If the identification information has not been reported within the predetermined time, the registration device 325 assumes that the gaming chip 72 with the identification information has been lost from the chip tray (stolen by the player or dealer) and performs the cancellation process for the gaming chip 72.

If the gaming chip 72 is found to have been stolen by a method other than those described above, the registration device 325 also identifies the identification information of the stolen gaming chip 72 and then performs the cancellation process. For example, if a gaming chip 72 is stolen from a chip holding means such as a chip tray on the table 36, the registration device 325 may perform the cancellation process for all gaming chips 72 whose identification information was read as being in the chip holding device immediately before the theft. The gaming chips in the chip holding means may be read continuously.

As mentioned above, the types of the gaming chips 72 are defined by their attributes (whether they are non-redeemable NN chips or redeemable cash chips) and value ($10, $100, $1,000, etc.). For example, if the casino wants to revamp the design of a particular type of gaming chip, the casino will collect the old type of gaming chip 72 in circulation and perform the cancellation process. In this case, the casino will set a deadline and notify players of the deadline, and when the deadline arrives, the registration device 325 will make the status of all old gaming chips 72 unusable. Specifically, since the database 326 stores the type information 262 of each gaming chip 72 as shown in FIG. 5, the registration device 325 will refer to the database 326 and perform the cancellation process for the applicable type of gaming chip 72.

In addition, as described below, the RFID tag 721 of the gaming chip 72 is read by a reader/writer at each casino item handling location in the casino, and the identification information read from the RFID tag 721 is sent from each casino item handling location to the central verification device 323. The identification information read from the RFID tag 721 is sent from each casino item handling location to the central verification device 323. In addition, the table 36 identifies the player who owns the gaming chip 72 by recognizing each player. The database 326 records the history of information on the location of the gaming chips 72 (any casino item handling location in the casino or any player). The registration device 325 checks the history of the location information in the database 326, and when the same identification information is read by the reader/writers of multiple casino item handling locations, and when the combination of the readings satisfies the conditions for determining fraud, the registration device 325 carries out the cancellation process for the gaming chip 72 having the identification information.

In this casino system 30, each gaming chip 72 is tracked as described above. The function of tracking the whereabouts of each gaming chip 72 allows the system to determine where each gaming chip 72 is located in the casino and, if it is owned by a player, which player owns it.

The location history information for each gaming chip 72 can be used as a condition for the above fraud determination. Specifically, when the location of a certain gaming chip 72 has been updated, the registration device 325 may determine that it is fraudulent when the relationship between the current location and the latest location in the past is a combination of the following, for example: (1) A gaming chip 72 recognized as being owned by one player is next recognized as being owned by another player; (2) A gaming chip 72 recognized as present in the chip tray of one table 36 is next recognized as present in another table 36; (3) A gaming chip 72 recognized as being in the bank 34 is next recognized as being in the possession of a player; (4) A gaming chip 72 recognized as present in the cashier 33 is next recognized as present in the chip tray of the table 36; (5) A gaming chip 72 recognized as being in the bank 34 are next recognized as being in the cashier 33; (6) A gaming chip 72 recognized as present in the cashier 33 is next recognized as present in the bank 34; or (7) A gaming chip 72 recognized as present in the cashier 33, the bank 34, or the table 36 is next recognized as present in the gate 38.

If any of the above cases (1) to (7) applies, there is a suspicion that there has been an illegal transfer of the gaming chip 72, such as the transfer of the gaming chip 72 between players (money laundering is suspected), a player has illegally stolen the gaming chip 72 owned by the casino, or there are multiple gaming chips with the same identification information. Therefore, the registration device 325 shall perform the cancellation process for such a gaming chip 72.

In addition, the registration device 325 performs the cancellation process for gaming chips 72 that have identification information that has not been read by a reader/writer at any casino item handling location in the casino for a predetermined period of time or longer. In this case as well, the registration device 325 refers to the location history information in the database 326 to determine that the chip has not been read by the reader/writer of any casino item handling location for a predetermined period of time or longer.

In addition, although not illustrated in FIG. 4, if the removal of the gaming chips 72 from the floor area 302 to the outside is prohibited, and therefore the introduction of the gaming chips 72 from the outside to the floor area 302 is also prohibited, a gate system similar to the cashier system 330, the bank system 340, and the pit system 350 described above may be provided at gate 38. In this case, at the gate 38, players entering or exiting the floor area 302 are exposed to electromagnetic waves to detect the RFID tags 72 along with their personal belongings. This electromagnetic wave is emitted from other antennas installed at the entry and exit gates, and an RFID reader is connected to the antenna.

At the gate 38, the gaming chip 72 that are attempted to be taken out or taken in will be confiscated by the gate security staff as unusable. After this, the confiscated gaming chip 72 is brought from the gate 38 to the procedure room system 320, where it is deactivated by the registration device 325.

For the gaming chips 72 that are to be credited from the floor area 302 to the bank 34, the cancellation process is performed by the registration device 325 on the gaming chips 72 that are to be transferred before the transfer for credit begins. For example, for a gaming chip 72 to be moved (credited) from the pit 35 to the bank 34, the pit reader/writer 352 reads the identification information from the RFID tag 721 and sends it to the registration device 325. For the gaming chip 72 identified by the transmitted identification information, the registration device 325 performs the cancellation process and sets the status to "unusable".

In the above example, in the cancellation process, the registration device 325 rewrites the status of the gaming chip 72 to "unusable" while leaving the record of the gaming chip 72 in the database 326, but alternatively, the registration device 325 may delete from the database the information on the gaming chip 72 which the registration as a usable gaming chip 72 to be canceled. It is also possible for the registration device 325 to selectively perform both the deletion of the record from the database 326 and the rewriting of the status. In this case, the deletion of records from the database 326 is referred to as cancellation of registration or destruction, and the rewriting of the status to unusable is referred to as deactivation.

In the case of deleting a record of a gaming chip 72 from the database 326 as a cancellation process, instead of making the status unusable, the database 326 need not have information on the status for each gaming chip 72. In this case, the fact that there is a record (registered) of the gaming chip 72 in the database 326 means that the gaming chip 72 in question is usable, and the fact that there is no record (not registered) of the gaming chip 72 in the database 326 means that the gaming chip 72 in question is unusable.

If the identification information read from the RFID tag 721 of the gaming chip 72 is not stored in the database 326, the registration device 325 may add the identification information to the black list to prevent the identification information from being registered thereafter. In this case, the chip notation ID of the gaming chip 72 in question may be further checked and the checked chip notation ID may be recorded in the black list. This is because that in this situation, the identification information is likely to be forged, while the chip notation ID is likely to be legitimate.

In the procedure room 32, destructive measures may be applied to gaming chips 72 whose status has been rendered unusable and whose records have been deleted from the database 326. In other words, the gaming chips 72 that have been deleted from the registration may be shredded to prevent them from being used fraudulently. If the registration device 35 selectively deletes records from the database 326 and changes the status to unusable, destructive measures may be taken for the gaming chips 72 that have been deleted from the database 326. The device for the verification process and the shredder may be combined, and the gaming chips to be destroyed may be crushed after they are made unusable.

Reactivation

For a gaming chip 72 that has been deactivated, i.e., canceled the registration as a usable gaming chip 72 by updating the activation status from "usable" to "unusable," "suspicious," "needs attention," etc., if the predetermined conditions are met, the registration device may perform the activation process again. Specifically, the activation status of the deactivated gaming chip 72 may be set back to "usable" again.

For example, a gaming chip 72 that is suspected of having a malfunction may be canceled the registration as a usable gaming chip 72 (its activation status may be set to "unusable"), and after it is confirmed that there is no malfunction or it is repaired, the activation status may be changed back to "usable".

Alternatively, a gaming chip 72 that is moved from the 36 to the bank 34 by credit may be canceled the registration as a usable gaming chip 72, and after the gaming chip 72 arrives at the bank 34 by credit, before it is used again in floor area 302, the registration device may reactivate the gaming chip 72.

If the activation status of the gaming chip 72 involved in the fraud is set to "suspicious" or "cautionary", and then it is confirmed that the gaming chip 72 is OK, the activation status of the gaming chip 72 may be set back to "usable".

In this way, the gaming chip 72 can be switched between the usable and unusable statuses at will by the registration device 325 and the database 326. This allows the activation status to be changed flexibly, such as making the status unusable only when moving, or in case of doubt, making the status unusable until it is confirmed that there is no problem, as described above.

Variant 1

Figure 8:
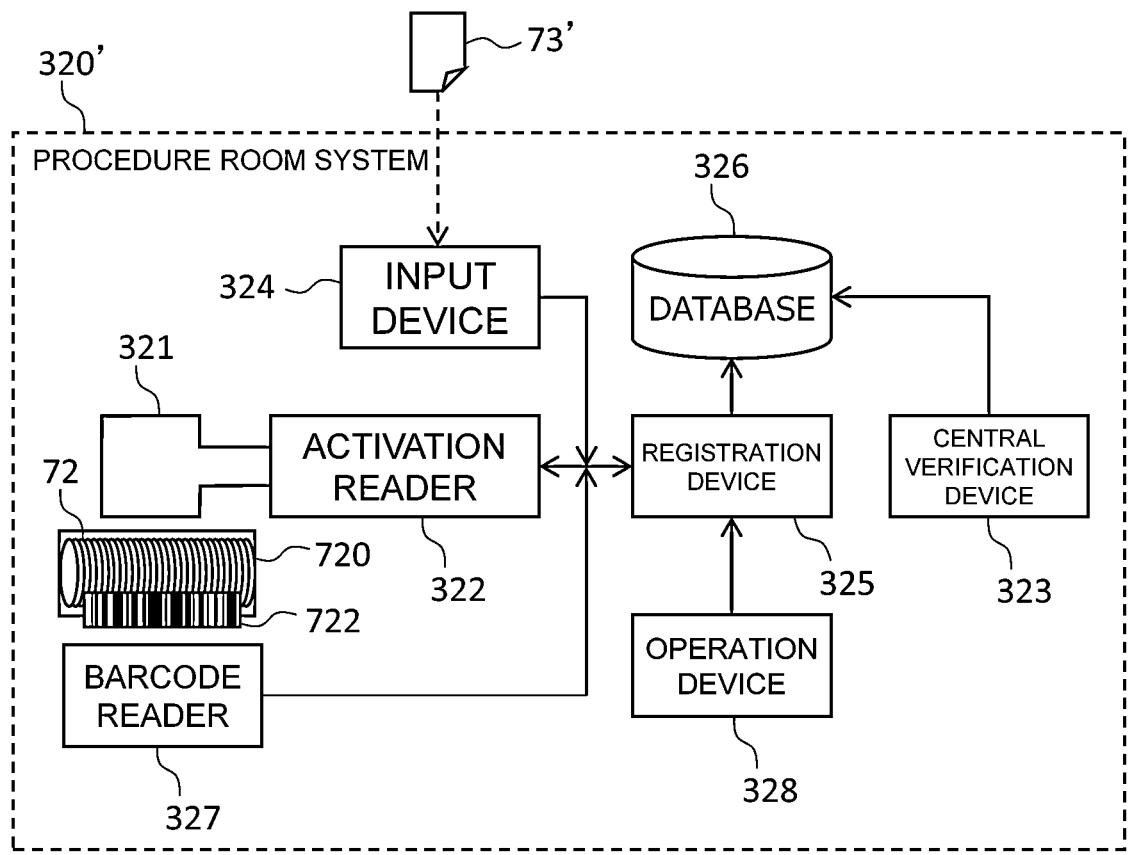
FIG. 8 shows a block diagram of a procedure room system of Variant 1 according to the first embodiment of the present invention.

FIG. 8 shows a block diagram of a procedure room system of Variant 1 according to the first embodiment of the present invention. The procedural room system 320' of this variant 1 performs registration and activation procedures for a plurality of gaming chips 72 simultaneously. The plurality of gaming chips 72 are registered and activated while they are housed in a chip case 71. The chip case 71 is provided with a barcode 722 as case identification information to identify the chip case 71.

In the data file 73 provided by the manufacturer of the casino item to the casino 300, the code information represented by the barcode 722 is mapped to the information of each gaming chip 72. The procedure room system 320' is further equipped with a bar code reader 327. The barcode reader 327 reads the barcode 722 of the chip case 71 that contains the gaming chip 72 for activation.

The antenna 321 and the activation reader 322 simultaneously read the RFID tags 721 of a plurality of gaming chips 72 housed in the chip case 720. The plurality of identification information read from the RFID tags 721 of the plurality of gaming chips 72 by the antenna 321 and the activation reader 322, the information in the data file 73' decoded by the input device 324, and code information of the barcode 722 of the chip case 71 read by the barcode reader 327 are input to the registration device 325. The registration device 325 first determines whether or not the code information of the chip case 71 given by the manufacturer of the gaming chip 72 and the code information of the chip case 71 read by the barcode reader 327 match. In other words, the registration device 325 first determines whether the chip case 71 itself is the chip case that should be there.

Next, the registration device 325 identifies, from the data file 73', the identification information of the gaming chips 72 corresponding to the code information of the barcode 722, i.e., the plurality of gaming chips 72 for registration and activation. The registration device 325 determines the authenticity of those gaming chips 72 by matching the identification information of the identified gaming chips 72 with the identification information read from the RFID tag 721 of the gaming chip 72 pertaining to the activation by the activation reader/writer 322. If all the gaming chips 72 for registration and activation are successfully matched, the registration device 325 registers the gaming chips 72 by setting the status of the gaming chips 72 as "usable" and storing the information of the gaming chips 72 in the database 326.

According to this configuration, the gaming chips 72 can be housed and managed in chip cases 720 from manufacture to activation, and it can be guaranteed that there is no excess or deficiency of the gaming chips 72 that should be housed in each chip case 720.

Variant 2

Figure 9:
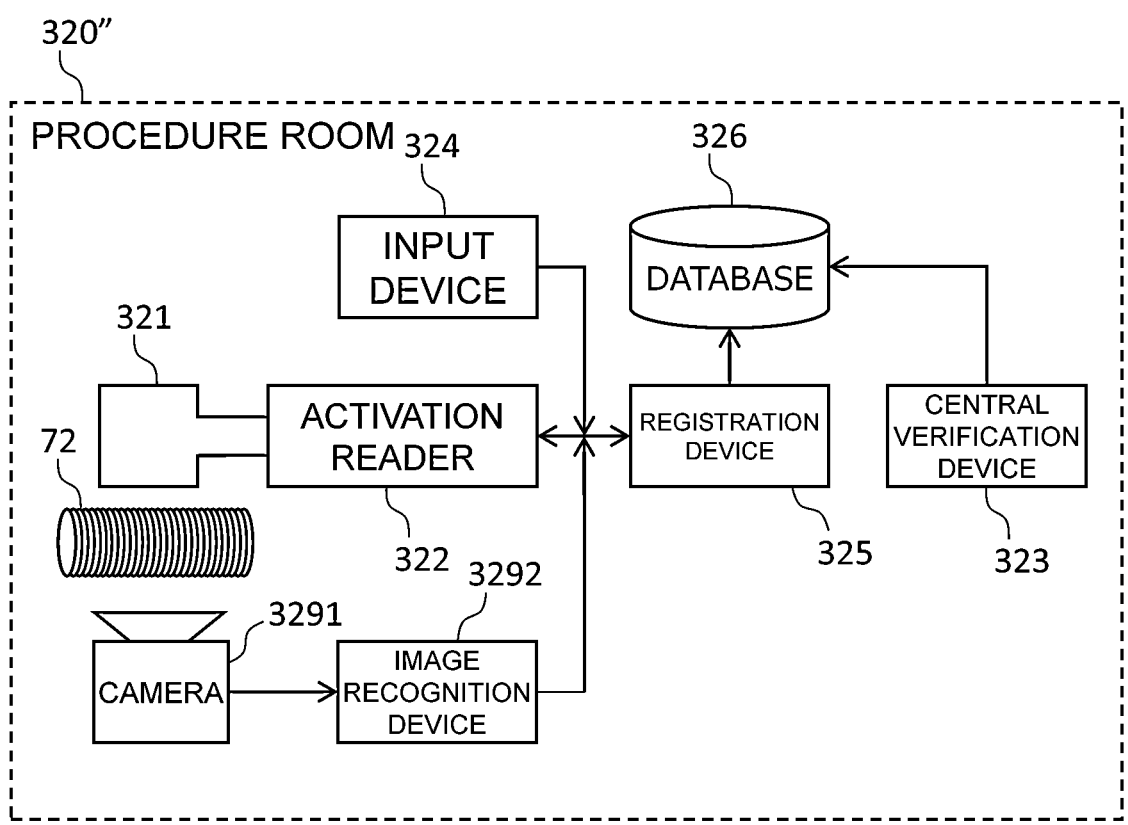
FIG. 9 shows a block diagram of a procedure room system of Variant 2 according to the first embodiment of the present invention.

FIG. 9 shows a block diagram of a procedure room system of Variant 2 according to the first embodiment of the present invention. The procedure room system 320" of this variation 2 also performs registration and activation procedures for a plurality of gaming chips 72 at the same time. The gaming chips 72 have type information stored in them as well as identification information. The procedure room system 320" is equipped with a camera 3291 that captures the sides of the plurality of gaming chips 72 whose RFID tags 721 are read by the antenna 321 and generates an image, and an image recognition device 3292 that performs image recognition on the images generated by the camera 329.

The plurality of gaming chips 72 are photographed by the camera 329 in a stacked state. The camera 3291 generates image data by taking pictures. The image recognition device 3292 performs image recognition on the image data to determine the types of the plurality of gaming chips 72 by the patterns appearing on the sides thereof. In this embodiment, as shown in FIG. 2, the sides of the gaming chips 72 have a center line as a pattern, and the color of the center line represents the type of the gaming chip 72 concerned. Therefore, the image recognition device 3292 recognizes the center line from the image and determines the type of the gaming chip 3292 in the image by its color.

The registration device 325 determines whether the type of the plurality of gaming chips read by the activation reader 322, i.e., the respective number of chips of each type, matches the type of the plurality of gaming chips recognized by the image recognition device 3292, i.e., the respective number of chips of each type.

According to this configuration, it is possible to inspect whether or not the types of 72 gaming chips for registration and activation, as determined from their appearance, match the types stored in the RFID tag 721. It is also possible to inspect whether or not the number of gaming chips 72 that can be seen from the external appearance matches the number of chips for which the RFID tags 721 are read.

In this variant 2, the type of the gaming chip 72 is identified from its appearance and whether or not it matches the type stored in the RFID tag 721 is determined. However, instead of using the image and the RFID tag 721 to determine the type, the gaming chips 72 may be inspected by recognizing the number of the gaming chips 72 based on the image by the image recognition device 3292 and determining the recognized number matches the number of RFID tags 721 read by the activation reader 322. In this variant 2, the plurality of gaming chips 72 may not be inspected simultaneously, but may be inspected one by one.

In the above variant 1, for the plurality of gaming chips 72 contained in the chip case 720, the identification information and other information of the gaming chips 72 contained in the chip case 720 are determined by reading the RFID tag 721, while the barcode reader 327 is used to read the barcode 722, and by referring to the data file 73', the identification information and other information of the gaming chip 72 contained in the chip case 720 are determined, and the gaming chips 72 are inspected by comparing the determined information. In the above variant 2, the type of the plurality of gaming chips 72 is determined by reading the RFID tags 721 of the plurality of gaming chips 72, and the type of the gaming chips 72 contained in the chip case 720 is determined by capturing the sides of the plurality of gaming chips 72 with the camera 329 and performing image recognition, and the gaming chips 72 are inspected by comparing the determined information.

As another example, the gaming chips 72 may be inspected by the number of gaming chips 72 contained in the chip case 720 without using the barcode reader 327 or the camera 329. That is, the number of gaming chips 72 contained in the chip case 720 is known by using a case known to the procedure room system 320 as the chip case 720, and the number of RFID tags 721 read by the antenna 321 and activation reader 322 is checked to see if the number of tags is equal to the known number. The number of gaming chips 72 in the chip case 720 is known by using the known chip case, and the gaming chips 72 may be inspected by checking whether the number of RFID tags 721 read by the antenna 321 and activation reader 322 is the known number.

The inspection may also be performed based on information input by the operator of the activation procedure from the operation device 328 instead of the camera 3291 and the image recognition device 3292. The operator may, for example, by visually inspecting a plurality of gaming chips 72, identify their type information and input it into the input device. In this case, the registration device 325 may inspect the gaming chips 72 by determining whether or not the information on the type of the gaming chips 72 entered by the operator in the operation device 328 matches the information on the type read from the RFID tag 721 of the gaming chips 72 by the activation reader 322.

The registration device 325 may also inspect the gaming chip 72 by determining whether or not the information of the type entered by the operator into the operation device 328 matches the information of the type recorded in the data file 73 given by the manufacturer of the casino item.

Variant 3

In the first embodiment described above, the status was stored as activation information in the database 326 and the RFID tag 721 built into the gaming chip 72, but the activation information may not be recorded in the RFID tag 721. Also, the activation information is not recorded in the database 326, and a table containing only the usable gaming chips 72 that have been activated in the database 326 is created, and the central matching device 323 stores in the table the identification information corresponding to the identification information read from the RFID tag 721 of the gaming chip 72 to be verified. The central matching device 323 may determine whether or not the gaming chip 72 is an activated and usable gaming chip 72 by determining whether or not the identification information corresponding to the identification information read from the RFID tag 721 of the gaming chip 72 to be verified exists in the table.

The status of the activation information may be recorded only in the RFID tag 721 of the gaming chip 72 without using the database 326. In this case, at the registration device 325, upon activation, the status is recorded as "usable" on the RFID tag 721 of the gaming chip 72 (prior to that, i.e., at the factory, the status is "unusable"). By reading the status from the RFID tag 721 of the gaming chip 72, each casino item handling location can immediately determine whether the gaming chip 72 can be used or not.

Variant 4

In the first embodiment described above, as a cancellation process, the status of the activation information is set to "unusable" or the record is deleted from the database 326. In addition to "usable" and "unusable" as the status of activation information, for example, "suspicious", "unknown", and the like statuses may be prepared, and the registration device 325 may record these "suspicious", "unknown", and the like statuses as the cancellation process. In this case, the casino 300 may confiscate the gaming chips 72 whose status is "unusable" and take measures according to the status if the status is "suspicious", "unknown", etc. For example, if the status is "suspicious", the casino may interview the player who owns the gaming chip 72, or check the video taken by the camera, and if the suspicion is confirmed, allow the player to exchange the chip 72 for a gaming chip with a status of "usable".

Since the gaming chip 72 can be exchanged for cash and is the property of the player, it may not be appropriate to immediately change the status of the gaming chip 72 to "unusable" and make the gaming chip 72 unusable for cash at the stage of suspicion. On the other hand, it is also inappropriate to allow the free use of the gaming chip 72 (e.g., betting on games, cashing in, etc.) by leaving the status as "usable" when there is a suspicion of fraud. Therefore, as described above, by setting a status such as "suspicious" that is neither "usable" nor "unusable," appropriate measures can be taken when there is a suspicion of fraud.

In this way, it is possible to update the status of various gaming chips 72 suspected of fraud by making it possible to set the status of activation information to not only "unusable" but also "suspicious" as a cancellation process. For example, all gaming chips 72 that are read in the chip tray or betting area of the table 36 in charge of the dealer or player involved in the fraud, i.e., all gaming chips 72 that are read in the chip tray or betting area of the table 36 in charge of such dealer or player, may be canceled the registration as a usable gaming chip, and all gaming chips 72 that are owned by such a player may be canceled the registration as a usable gaming chip. In addition, if a rogue gaming chip 72 is found, the game in which the rogue gaming chip 72 was used at the table 36 may be identified retroactively, and the cancellation process may be performed for all gaming chips 72 involved in that game (that were simultaneously wagered or redeemed). Furthermore, for games where payout or collection at the table 36 did not occur correctly, the cancellation process may be performed for all gaming chips 72 involved in that game. Also, all gaming chips 72 involved in a game in which a player wins a large amount of money may be canceled the registration as a usable gaming chip. In these cases, the registration device 325 may update the status of the activation information to "suspicious" as a cancellation process.

Variant 5

As described above, a plurality of attributes may be defined for the gaming chip 72, and among the attributes there is NN chip, such as rolling chip, which are subject to restrictions in that they may be bet on but not redeemed for cash at the cashier 33, but are also subject to cash back and other benefits when purchased. If a player bets an NN chip, and loses the game, the dealer collects the NN chip from the player. The NN chip will not be paid out as a payout to the winning player in a subsequent game at that table.

Therefore, the status of the NN chip may be set to "unusable" at the timing when it is collected in the chip tray. Specifically, when a NN chip is newly collected in the chip tray, the table verification device 363 sends its identification information to the central verification device 323. When the central verification device 323 receives the identification information of the rolling chip read by the chip tray reader/writer 362a, the registration device 325 correspondingly performs a cancellation process for the identification information. As a result, the NN chip collected in the chip tray is immediately rendered unusable and thereafter becomes unusable until the activation process is performed again at the registration device 325.

Variant 6

In the first embodiment described above, the device that performs the registration of the gaming chip and the device that performs the cancellation process of the gaming chip are the same device, but they may be separate devices. Also, although the device that performs the registration and the device that performs the cancellation process are located in the procedure room 32 in the security area 301, one or both of these devices may be located in the casino item handling location in the floor area 302. For example, the registration device 325 may be located in each pit 35 instead of the procedure room 32. At each pit 35, a pit reader/writer 352 may perform the same process of registration as described above, for the gaming chips 72 that are filled from the bank 34 and/or perform the cancelation process for the gaming chips 72 that are credited to the bank 34.

With this configuration, a new gaming chip 72 is registered and activated only when it is brought into the pit 35 near the table 36, so that even if it is stolen by a player or casino staff member during the journey out of the security area 301 to reach the pit, such gaming chip 72 will not have been activated yet, thus preventing the stolen gaming chip 72 from being effectively used. In addition, by installing the registration device 325 in the table 36, when a suspected fraudulent act occurs, the status of the gaming chip 72 suspected to be involved in the fraud can be immediately set to "suspicious" or "unusable" in the table 36.

Variant 7

As described above, each casino item handling location is equipped with a reader/writer that reads from and writes to the RFID tag 721 of the gaming chip 72. Therefore, the casino system 30 may manage the movement of the gaming chip 72 in the casino. The casino system 30 may, in particular, manage the movement of the gaming chips 72 in the security area 301. The security area 301 is divided into a plurality of locations, including the cashier 33. The gaming chip 72 has an RFID tag 721 that stores identification information. The casino system 30 has a first reader that reads the identification information from the RFID tag 721 of the gaming chip 72 as it moves between the plurality of casino item handling locations, a second reader that reads the identification information from the RFID tag 721 of the gaming chip 72 as it exits the security area 301 to the floor area 302, and a recording device that records the identification information read by the first and second readers as the movement history of gaming chips 72. With this configuration, the movement of gaming chips 72 in the casino can be managed.

In the casino system 30, the recording device may record the destination and/or the source of the movement as well as the identification information in the movement history. This configuration makes it possible to ascertain whether the movement is accurate.

The casino system 30 may further comprise a management device that determines whether a move is appropriate or not based on the movement history. This configuration allows inappropriate moves to be detected.

In the casino system 30, the management device may record, in the recording device, that a gaming chip 72 having a movement history that does not conform to the predetermined possibilities of the movement history is fraudulent or suspected to be fraudulent.

The casino system 30 may further comprise a third reader that reads identification information from the RFID tags 721 of the gaming chips 72 entering the security area 301 from the floor area 302. This configuration allows for advanced management of the gaming chips 72 in the casino.

In the casino system 30, the management device may issue an alert or record an alert when a destination is recorded in the movement history of a gaming chip 72 that leaves the floor area 302, and the gaming chip 72 is not received at the destination. This configuration can detect that the movement from the security area 301 to a predetermined location in the floor area 302 has not been completed successfully.

In the casino system 30, the management device may issue an alert or record when the gaming chip 72 is not received at the destination within a predetermined time. This configuration allows the system to determine that there is an abnormality if the move is not completed within a predetermined time.

Further, a chip management system may be configured to include the above casino system. The chip management system may comprise the casino system described above and a fourth reader that is installed at the gaming table and reads identification information from the RFID tag 721 of the gaming chip 72. This configuration enables the management of gaming chips 72 in the casino, including the security floor 302.

In the chip management system, the management device may calculate the total amount of gaming chips 72 held by players in the casino. This configuration allows the total amount owed by the casino in real time to be ascertained.

In the chip management system, the management device may record the date and time information in the movement history. This configuration allows the movement history to be recorded in more detail.

In the chip management system, the management device may detect suspicious movements of the gaming chip 72 based on the date and time information. In this configuration, various suspicious movements can be detected.

In the chip management system, the management device may record the information of the staff involved in the movement in the movement history. In this configuration, when there is an inappropriate movement, the staff involved in it can be identified.

Other Variants

In the first embodiment described above, a pit 35 is provided in the floor area 302 to manage a plurality of tables 36, but there may be no pit 35. In this case, the tables 36 may be provided with cabinets that house the new casino items (playing card packages, gaming chips, dice, etc.) to be used. The cabinet may be equipped with an antenna and a reader for reading the RFID tags attached to the casino items stored therein.

In the first embodiment described above, an example in which the casino item is a gaming chip 72 with a built-in RFID tag 721 is described, but the casino item is not limited to a gaming chip. The casino item may be, for example, a playing card, and in particular may be a playing card package in which a plurality of decks of randomly shuffled playing cards are packaged. Also, each and every playing card may be managed as a casino item.

In the first embodiment described above, each of the gaming chips 72 as a casino item, was given identification information, and the gaming chip 72 had identification information given by means of RFID tag 721. Alternatively, the identification information may be written on the surface (preferably on the side) of the gaming chip 72 in a form that is difficult to see with the naked eye. For example, a dot pattern may be formed on the side surface with dots of a size that is difficult to recognize with the naked eye, and the identification information of the gaming chip 72 may be recorded in this dot pattern. In this case, a camera or scanner is provided at the casino item handling location such as table 36. At the casino item handling location, the side of the gaming chip 72 may be captured and image analysis may be performed on the captured image to obtain the identification information of the gaming chip 72.

The procedure room system 320 may present a list of all gaming chips 72 whose status is usable and/or calculate a total amount by referring to the database 326. The procedure room system 320 may also calculate the total amount for each type of location (e.g., the total amount for the plurality of gaming chips 72 present in the cashiers 33, the total amount of the plurality of gaming chips 72 present in the plurality of tables, the total amount of the plurality of gaming chips owned by players, etc.) may be calculated.

Second Embodiment

The second embodiment relates to a cage system for managing gaming chips in a cage in a casino and a chip management system including the cage system.

A gaming chip tracing system is known as a system for managing gaming chips in a casino, in which an RFID tag storing at least a gaming chip ID is embedded in a gaming chip, and by associating the gaming chip ID with a user ID, the system monitors which user is in possession of which gaming chip.

Also known is a gaming chip security system that stores a valid gaming chip ID in a database and determines the validity or authenticity of the gaming chip by reading the gaming chip ID from the RFID tag of the gaming chip in the casino (e.g., at a table) and checking it against the database (see, for example, JPA2019-5565).

Gaming chips are brought into the casino through a cage inside the casino, and gaming chips to be discarded are also taken out of the cage. Conventional gaming chip tracing systems do not necessarily monitor the movement of all gaming chips in the casino, including the movement of gaming chips inside the cage and between the cage and each location in the casino.

Therefore, the second embodiment provides a cage system for monitoring the movement of gaming chips in the cage and the movement between the cage and each location in the casino, and a gaming chip management system including the cage system for managing the gaming chips in the casino.

One aspect of the present embodiment is a cage system for managing the movement of gaming chips in a cage in a casino hall, wherein the cage is divided into a plurality of locations including cashiers, the gaming chips have RFID tags storing chip IDs, and the cage system comprise: a first reader configured to read the chip ID from the RFID tag of the gaming chip moving between the plurality of locations; a second reader configured to read the chip ID from the RFID tag of the gaming chip exiting the cage into the casino hall; and a recorder configured to record the chip ID read by the first reader and the second reader as the movement history of the gaming chip. With this configuration, the movement of the gaming chips in the cage can be managed.

In the cage system described above, the recorder may record the destination and/or the source of the movement along with the chip ID in the movement history. With this configuration, it is possible to determine whether the movement is performed accurately.

The cage system described above may further comprise management device configured to determine whether the movement is appropriate based on the movement history. With this configuration, inappropriate movement can be detected.

In the cage system described above, the management device may record, in the recorder, that the gaming chip with a movement history that does not conform to the predetermined possibilities of the movement history is suspected to be fraudulent or illegal.

The cage system described above may further comprise a third reader configured to read the chip ID from the RFID tag of the gaming chip entering the cage from the casino hall. This configuration allows for complete control of the gaming chips in the cage.

In the cage system described above, the management device may issue an alert or record an alert when the destination is recorded in the movement history of the gaming chips leaving the cage for the casino hall, and when the gaming chips are not received at the destination. This configuration can detect that the transfer from the cage to the predetermined location in the casino hall was not completed successfully.

In the cage system described above, the management device may issue an alert or record if the gaming chips are not received at the destination within a predetermined time. With this configuration, it is possible to determine that there is an abnormality if the move is not completed within a predetermined time.

One aspect of the embodiment is a chip management system having a configuration comprising: the cage system of any of the above; and a fourth reader installed at a game table and configured to read the chip ID from the RFID tag of the gaming chip. With this configuration, gaming chips in a casino hall including cages can be managed.

In the above chip management system, the management device may calculate the total amount of the gaming chips held by the players in the casino hall. This configuration allows the total amount of debts of the casino in real time to be determined.

In the above chip management system, the management device may record the date and time information in the movement history. This configuration makes it possible to record the movement history in more detail.

In the above chip management system, the management device may detect suspicious movements of the gaming chips based on the date and time information. This configuration allows various suspicious movements to be detected.

In the above chip management system, the management device may record the information of the staff involved in the movement in the movement history. This configuration makes it possible to identify the staff involved in an inappropriate move when it occurs.

The cage system and the gaming chip management system will be described in detail below with reference to the drawings. However, the invention is not limited by the following embodiments, and the components in the following embodiments include those that can be easily assumed by those skilled in the art or are substantially the same.

Figure 10:
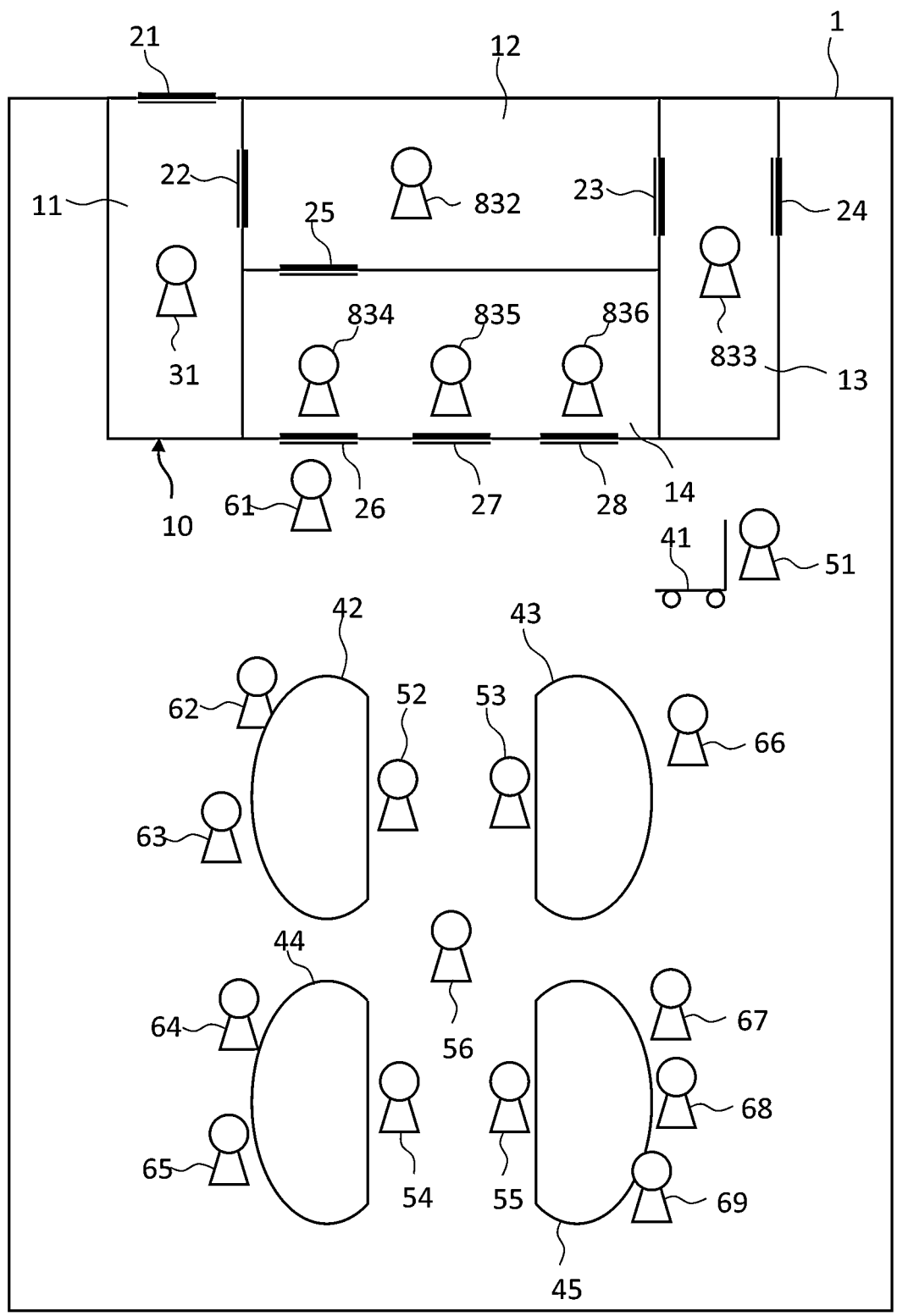
FIG. 10 shows a schematic diagram of an overall configuration of the casino according to the second embodiment of the present invention.

FIG. 10 shows a schematic diagram of an overall configuration of the casino according to the second embodiment of the present invention. The casino hall 1 is equipped with a cage 10 and a plurality of game tables 42-45. The floor on which the game tables 42-45 are equipped may be divided into a VIP floor and a mass floor. The cage 10 is a room that only security staff can enter. The cage 10 is divided into vault 11, main bank room 12, F/C bank room 13, and cashier room 14.

A gate 21 leading to the outside of the cage 10 is provided in the vault 11, a gate 22 is provided between the vault 11 and the main bank room 12, a gate 23 is provided between the main bank room 12 and the F/C bank room 13, a gate 24 is provided between the main bank room 12 and the cashier room 14, and a gate 24 is provided in the F/C bank room 13 leading to the casino hall 1 with game tables 42-45. In the cashier room 14, there are gates (windows) 26-28 leading to the casino hall 1. Each gate 21-25 may allow the traffic of people and gaming chips, or only gaming chips may pass through, and a door for people to enter and exit may be provided separately from the gate. The windows 26-28 are open enough to allow the exchange of gaming chips for cash.

The vault 11 has a vault staff 831, the main bank 12 has a main bank staff 832, the F/C bank room 13 has a F/C bank staff 833, and the cashier room 14 has a cashier staff 834-836 corresponding to windows 26-28. 34-836 are located in cashier room 14, corresponding to windows 26-28.

In the casino hall 1, the game tables 42-45 are installed, and one dealer 52-55 is placed at each game table 42-45. In the example of FIG. 10, only four game tables are shown, but in reality, more game tables are placed in the casino hall 1. In addition, pit managers 56 are arranged for a plurality of adjacent game tables 42.

In the example of FIG. 10, there are players 61-69 in the casino hall 1. Players in the casino hall 1 can purchase gaming chips or redeem gaming chips through any of the windows 26-28, like player 61 shown in FIG. 10. Players who have purchased gaming chips at cage 10 can bet gaming chips at game tables 42-45 and enjoy the game. If the player loses the game, the dealer collects the gaming chips, and if the player wins the game, the dealer reimburses the player according to the rules of the game and the amount of the bet. In this way, the amount of gaming chips a player has can increase or decrease depending on the game. When the player runs out of gaming chips, he can buy in again at cage 10. Players can also redeem (buy out) their gaming chips at the cage when they are done playing.

At the game tables 42-45, the gaming chips are collected from players who lose the game and gaming chips are paid to players who win the game. As a result, the number of gaming chips held by the dealer (casino) at the game table increases or decreases. When there is a shortage of gaming chips at the gaming table, the gaming chip transport staff 51 receives gaming chips from the gate 24 of the F/C bank room 13, transports them to the gaming table, and replenishes the gaming table. Replenishing the table games with gaming chips in this way is also called "fill". When there is an excess of gaming chips at the gaming table, the gaming chip transport staff 51 transports the gaming chips from the gaming table to the cage 10, and the gaming chips are stored in the F/C bank room 13 through the gate 24. This return of gaming chips from the game table to the cage 10 is also referred to as "credit".

When managing the movement history of gaming chips in the game hall 1, the source, destination, and possible locations between them are referred to as locations in the following. In the case of the example in FIG. 10, for example, each room and each game table in the cage 10 is called a location.

Figure 11:
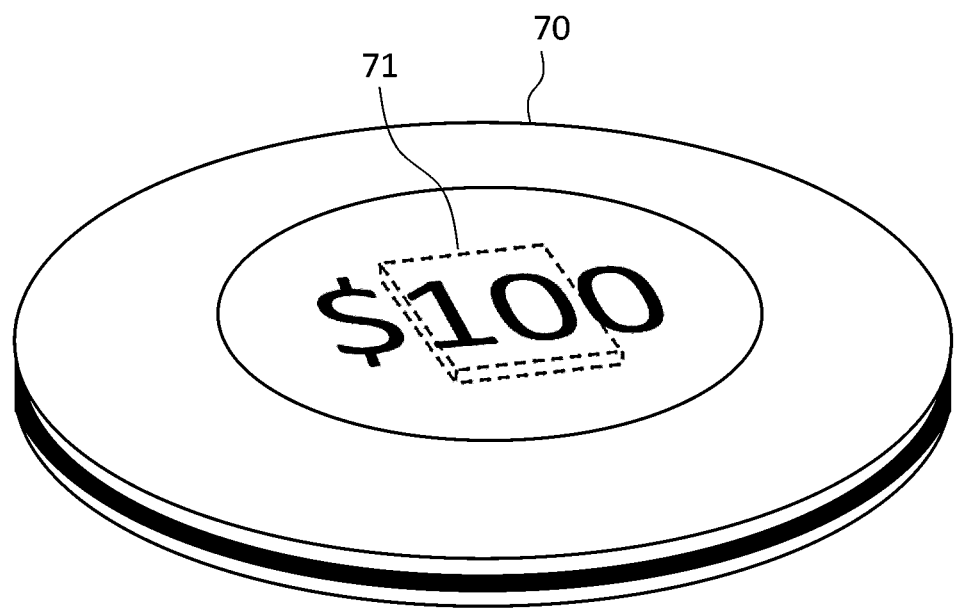
FIG. 11 shows a diagram of a gaming chip according to the second embodiment of the present invention.

FIG. 11 shows a diagram of a gaming chip according to the second embodiment of the present invention. A $100 gaming chip is shown in FIG. 11. The gaming chip 70 has a disc shape and the face value amount ("$100" in the case of FIG. 10) is shown on both sides. Multiple layers are laminated in the thickness direction in the order of a white layer, a colored layer, and a white layer, and it has a striped pattern on the side with the colored layer sandwiched between the white layers. The color of the colored layer differs depending on the face value of the chip, so the face value of the chip can be determined by identifying the color of the colored layer.

Inside the gaming chip 70 is an RFID tag 71, which stores the chip ID of the chip and the face value of the chip. The RFID tag 71 stores the chip ID of the chip and the face value of the chip. The RFID tag 71 may be writable, in which case the current location or holder of the gaming chip may be recorded in the RFID tag 71, and the history of the past location or holder may also be recorded in the RFID tag 71. The gaming chip 70 may be constructed by crimping a plurality of plates together, or may be constructed by resin molding.

Figure 12:
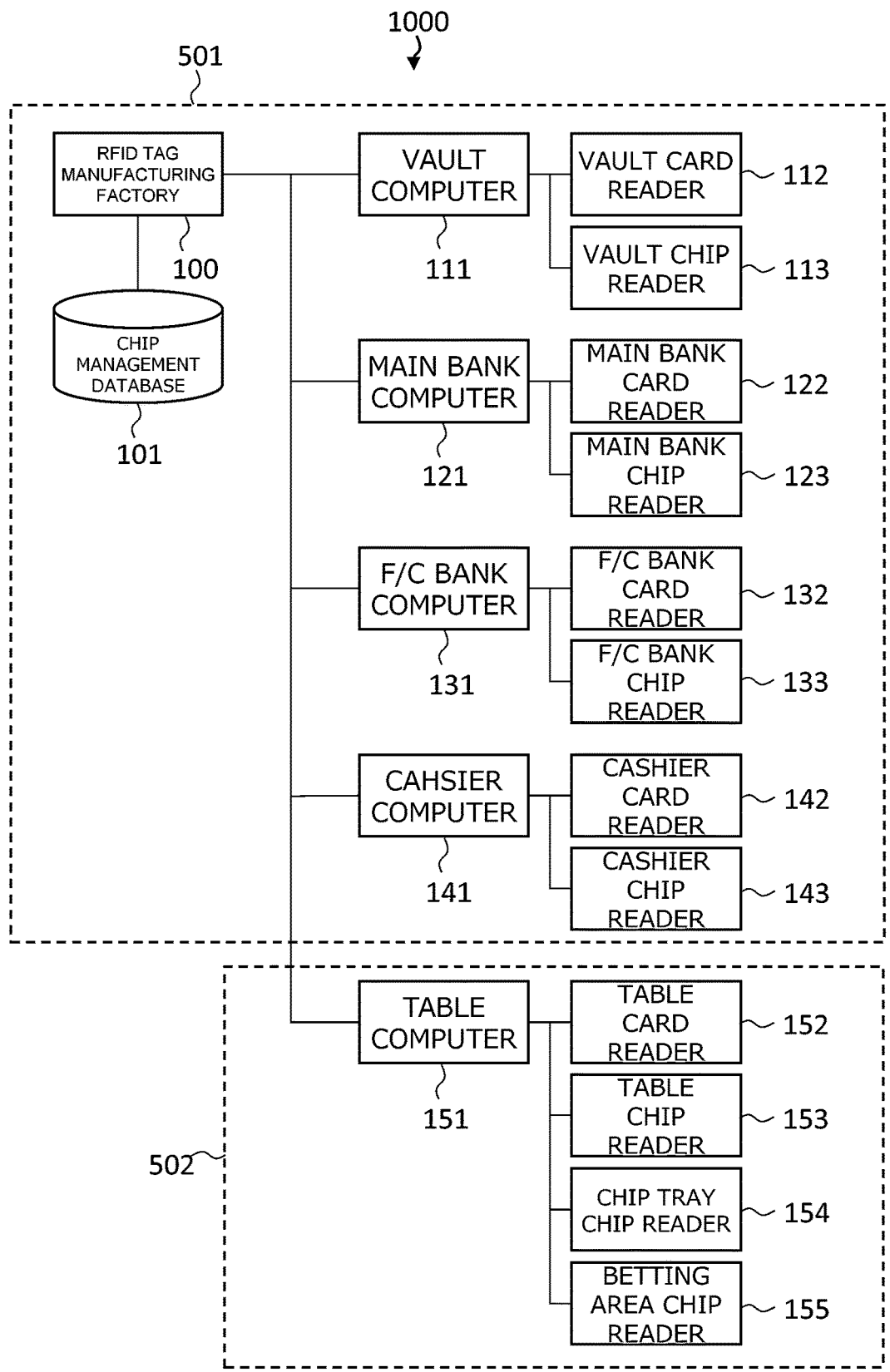
FIG. 12 shows a block diagram of the gaming chip management system according to the second embodiment of the present invention.

FIG. 12 shows a block diagram of the gaming chip management system according to the second embodiment of the present invention. The chip management system 1000 has a cage system 501 and a plurality of table systems 502. The table systems 502 are provided for each game table. The cage system 501 is equipped with a chip management computer 100 and a chip management database 101 for integrated management of chips in the cage 10 and in the casino hall 1.

The cage system 501 is also equipped with a vault computer 111 installed in the vault 11, and vault card readers 112 and vault chip readers 113 connected thereto. The cage system 501 is also equipped with a main bank computer 121 to be installed in the main bank room 12, and main bank card readers 122 and main bank chip readers 123 to be connected to it. The cage system 501 is also equipped with an F/C bank computer 131 installed in the F/C bank room 13, and F/C bank card readers 132 and F/C bank chip readers 133 connected to it. The cage system 501 has a cashier computer 141 installed in the cashier room 14 for each of the windows 26 to 28, and a cashier card reader 142 and a cashier chip reader 143 connected thereto.

The table system 502 has a table computer 151, a table card reader 152 connected thereto, a table chip reader 153, a chip tray chip reader 154, and a plurality of betting area chip readers 155. Although only one table system 502 is shown in FIG. 12, there are multiple table systems 502 corresponding to multiple game tables.

The vault computer 111, the main bank computer 121, the F/C bank computer 131, the cashier computer 141, the table computer 151, and the chip management database 101 are each connected to the chip management computer 100. The chip management computer 100, the other computers, and the chip management database 101 may be wired or wirelessly connected via a local network. Alternatively, the chip management computer 101 and the chip management data 101 may be installed on a wide area network (e.g., the Internet) and connected to other computers via the wide area network. In other words, the chip management computer 100 and the chip management database 101 may be installed in the cloud instead of in a casino.

Each of the computers 100, 111, 121, 131, 141, 151 is connected to an input device, not shown in the figure, for receiving operational input by the corresponding staff member. The input devices are, for example, keyboards, mice, buttons, touch pads, touch panels, and voice input devices. Only these input devices and communication devices may be left at the corresponding locations, and the functions of each computer may be integrated into the chip management computer 100. In this case, various signals (e.g., input signals input to the input devices, signals read by the chip reader, etc.) may be transmitted directly between the input devices, card readers, and chip readers at each location and the management computer 100.

The card readers 112, 122, 132, 142, and 152 at each location read the staff ID or player ID from the ID card held by the staff or player. Specifically, the vault card reader 112, the main bank card reader 122, and the F/C bank card reader 132 read the staff ID from the corresponding staff ID card, and the cashier card reader 142 reads the staff ID from the cashier staff ID card. The cashier card reader 142 reads the staff ID from the cashier staff ID card, and the cashier card reader 142 reads the staff ID from the cashier staff ID card. The table card reader 152 reads the staff ID of the corresponding dealer and reads the player ID of the player who plays.

The chip readers 113, 123, 133, 143, 153, 155 of each location read information from and write information to the RFID tag 71 of the gaming chip 70. In particular, each of the chip readers 113, 123, 133, 143, and 153 can read the information from the RFID tag 71 of the gaming chip 70 and write the information to the RFID tag 71 when the gaming chip 70 is moved from another location to that location and when the gaming chip is moved from that location to another location (i.e., when the gaming chip 70 leaves that location).

Figure 13:
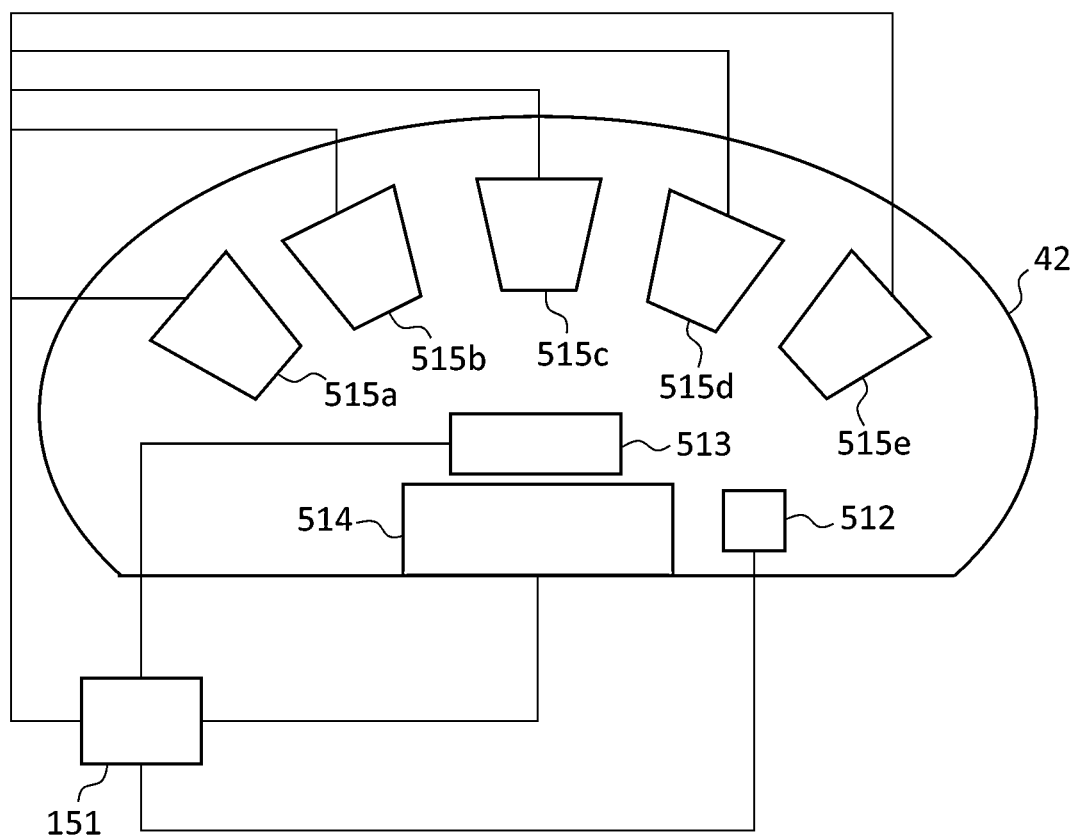
FIG. 13 shows a schematic diagram of a game table according to the second embodiment of the present invention.

FIG. 13 shows a schematic diagram of a game table according to the second embodiment of the present invention. In FIG. 13, a game table 42 is illustrated. The game table 42 is provided with a plurality of playing positions. The game table 42 has on the table surface a plurality of betting areas corresponding to the plurality of playing positions, a chip tray for containing the dealer's chips, a dealer area for reading and writing information on the RFID tags 71 of the gaming chips 70, and an ID card area for reading the ID cards of the dealer and the player.

The chip tray is provided with a tray antenna 514 for reading the RFID tags 71 of the gaming chips 70 contained therein. Each of the plurality of betting areas is provided with betting area antennas 515a-515e inside the table surface for reading the RFID tags 71 of the gaming chips 70 placed therein. In each of the multiple betting areas, a betting area antenna 515a-515e is provided inside the table surface for reading the RFID tag 71 of the gaming chip 70 placed therein; in the dealer area, a dealer antenna 513 is provided inside the table surface for reading the RFID tag 71 of the gaming chip 70 placed therein; in the ID card area, an ID card antenna 512 is provided inside the table surface.

Each antenna 512-515 is connected to the table computer 151 and transmits the readout signal to the table computer 151. The table computer 151 obtains various information stored in the RFID tags 71 and ID cards by decoding the signals from each antenna.

Staff members assigned to each location have their own card IDs to be read by the corresponding card readers before they go to work. The computer at each location transmits the read staff ID and its date and time to the chip management computer 100. The chip management computer 100 stores the staff IDs read by the card readers at each location in the chip management database 101 along with the location and the date and time information.

The chip management database 101 stores a player table, a chip table, a game table, a staff table, and a movement history table. The player table stores registration information of each player. The player table records, for each player, the player ID, various player attributes, as well as the player status such as VIP, suspicious, blacklist, etc. The chip table contains the chip ID, face value, type, and manufacturing information, as well as chip statuses such as valid, missing, stolen, and invalid. The game table contains the table ID, game type, etc. The staff table contains staff IDs, various staff attributes, and other information. The movement history table records histories of the locations or holders of the gaming chip 70.

Movement Management of Gaming Chips

Figure 14:
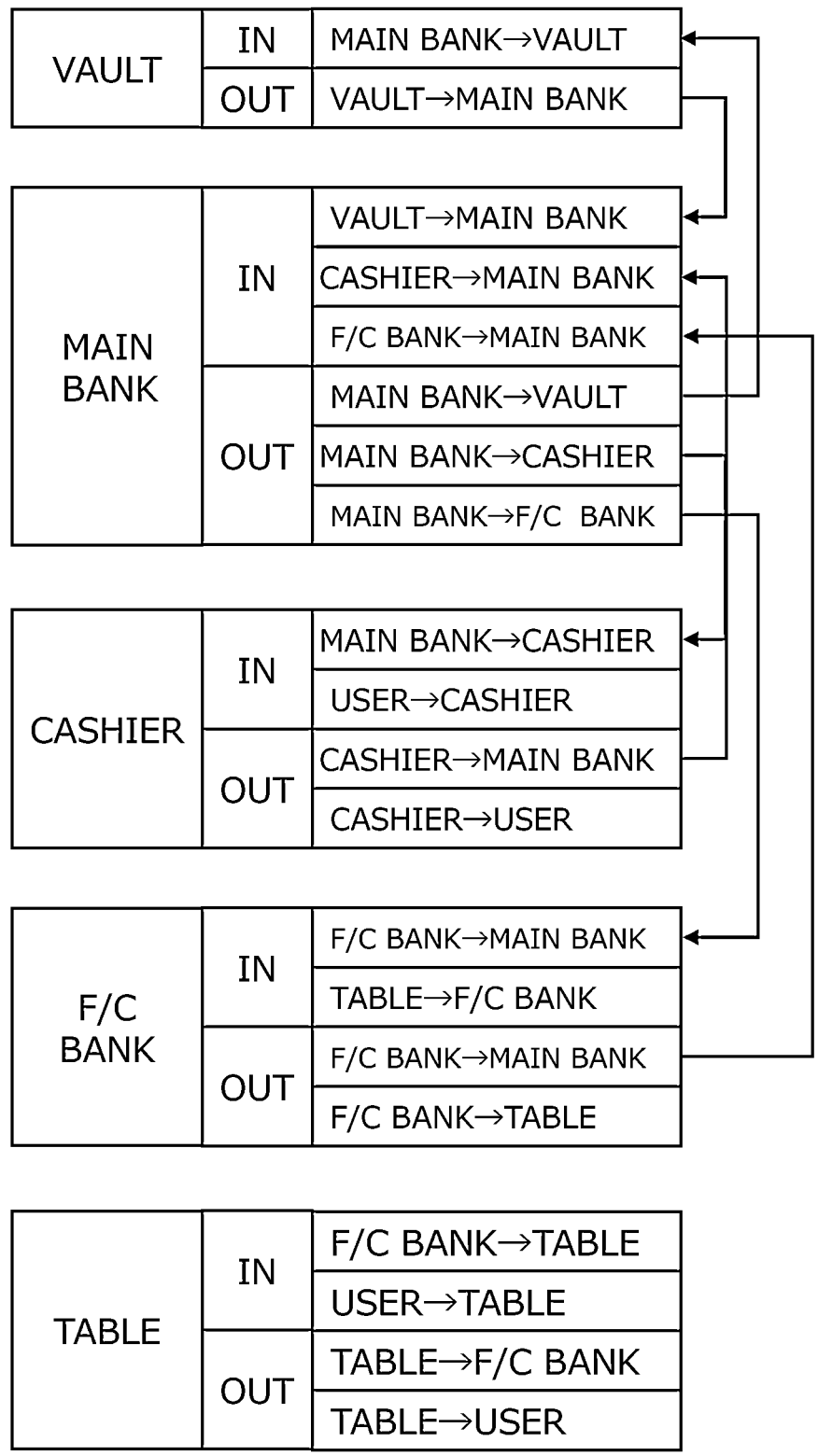
FIG. 14 shows how the gaming chips are moved according to the second embodiment of the present invention.

FIG. 14 shows how the gaming chips are moved according to the second embodiment of the present invention. As shown in FIG. 14, for each location except the vault, there are multiple possibilities of movement from the source when a gaming chip comes in, and multiple possibilities of movement to the destination when it goes out. The chip management system in this embodiment recognizes these moves. For this purpose, several methods can be employed as follows.

First Method

In the first method, when a gaming chip 70 comes in at a computer of each location, the source of the movement is designated at the computer of the location, and the designation is reported to the chip management computer 100 together with the chip ID of the incoming gaming chip 70. When a gaming chip 70 leaves a location, the information of the location or the source of the movement and the chip ID of the gaming chip 70 are reported to the chip management computer 100.

For example, when a gaming chip 70 moves from the main bank room 12 to the F/C bank room 13, the main bank computer 121 reads the chip ID of the gaming chip 70 with the main bank chip reader 123 and reports to the chip management computer 100 that it is leaving the main bank room 12 with the read chip ID. The chip management computer 100 reports this information to the chip management computer 100.

In the F/C bank room 13 that has received the gaming chip 70 from the main bank room 12, the F/C bank staff 33 operates the input device of the F/C bank computer 131 to input the designation that the gaming chip 70 is a gaming chip 70 that came from the main bank room 12 (the source), and the F/C bank chip reader 133 reads the chip ID of the gaming chip 70. The F/C bank computer 131 reports to the chip management computer 100 the read chip ID and the designation that the destination is the main bank room 12. The chip management computer 100 updates the chip management database 101 in response to this report.

FIG. 15 shows an example of data in a chip management database that is updated by the first method of managing movement of the gaming chips according to the second embodiment of the present invention. The example in FIG. 15 shows the movement history of a gaming chip 70 whose chip ID is "24825". The chip management database 101 stores the following information as information on the movement history of the gaming chip 70: chip ID 601, entry/exit information 602, movement source information 603, movement destination information 604, and date and time 605 of the gaming chip.

According to the first method, as shown in FIG. 15, for a gaming chip 70 leaving a location, information on the source of movement is obtained (history H61), and for a gaming chip 70 entering a location, information on the source and destination of movement is obtained (history H62). Based on the history H61 and the history H62, it can be confirmed that the gaming chip 70 has indeed left the main bank room 12 and has been received in the F/C bank room 13.

Second Method

In the second method, in a computer at each location, when a gaming chip 70 leaves, the destination is designated in the computer at that location, and the designation is reported to the chip management computer 100 along with the chip ID of the outgoing gaming chip 70, and when a gaming chip 70 enters each location, the information of the location or destination and the chip ID of the gaming chip 70 are reported to the chip management computer 100.

For example, when a gaming chip 70 is transferred (credited) from Table-4 to F/C bank room 13, the dealer reads the chip ID of the gaming chip 70 with the table chip reader 153 at the game table, and operates the input device of the table computer 151. When the gaming chip 70 is transferred (credited), the dealer reads the chip ID of the gaming chip 70 with the table chip reader 153 at the game table and designates the F/C bank room 13 as the destination (designates the credit) by operating the input device of the table computer 151. The table computer 151 reports this chip ID, the F/C bank room 13 as the destination, and the table ID of table-4 as the source to the chip management computer 100. The chip management computer 100 updates the chip management database 101 in response to this report.

At the destination F/C bank room 13, upon receiving the gaming chip 70, the F/C bank staff 33 reads the chip ID of this gaming chip 70 with the F/C bank chip reader 133. The F/C bank computer 131 reports the read chip ID and the fact that the chip is coming into the F/C bank room 13 to the chip management computer 100. The chip management computer updates the chip management database 101 in response to this report.

FIG. 16 shows an example of data in a chip management database that is updated by the second method of managing movement of the gaming chips according to the second embodiment of the present invention. Also in the example of FIG. 16, the movement history of a gaming chip 70 whose chip ID is "24825" is shown. The chip management database 101 stores the following information as information on the movement history of the gaming chip 70: chip ID 601, entry/exit information 602, movement source information 603, movement destination information 604, and date and time 605 of the gaming chip.

According to the second method, as shown in FIG. 16, for a gaming chip 70 that is leaving a location, information on its source and destination is obtained (history H71), and for a gaming chip 70 that is entering a location, information on its destination is obtained (history H72), and based on the history H71 and the history H72, it can be confirmed that the gaming chip 70 did indeed leave the table-4 and was received in the F/C bank room 13.

Third Method

The third method is a combination of the first method and the second method. That is, in the computer of each location, when a gaming chip 70 enters, the source of the movement is specified, and when a gaming chip 70 leaves, the destination of the movement is specified.

Fourth Method

In the fourth method, the staff at each location designates, using the input device of the computer at each location, whether a gaming chip 70 is leaving or entering, and reports the designation to the chip management computer 100 along with the chip ID of the gaming chip 70 read by the chip reader. The chip management computer 100 updates the entry/exit information and location information in the chip management database 101 based on this report.

FIG. 17 shows an example of data in a chip management database that is updated by the fourth method of managing movement of the gaming chips according to the second embodiment of the present invention. The chip management database 101 stores, as information on the movement history of the gaming chip 70, information on the chip ID 601, entry/exit information 602, location information 603, and date and time 604 of the gaming chip.

According to the fourth method, since the entry/exit information 602 and the location information 603 are recorded as shown in FIG. 17, it can be confirmed that the gaming chip 70 has indeed left the vault 11 and been received in the main bank room 12 based on the history H81 and the history H82.

Fifth Method

In the fifth method, only the location information is recorded. That is, the staff at each location reads the chip ID of the gaming chip 70 with the chip reader at that location when the gaming chip 70 is at that location, and reports it to the chip management computer 100. The chip management computer 100 updates the chip management database 101 in response to this report. The staff at each location may read the chip ID at the timing when the gaming chip 70 is moved to the location, or at the timing when the gaming chip 70 is moved from the location, or at any other timing.

FIG. 18 shows an example of data in a chip management database that is updated by the fifth method of managing movement of the gaming chips according to the second embodiment of the present invention. The chip management database 101 stores information on the chip ID 601, location information 603, and date and time 604 of the gaming chip in question as information on the movement history of the gaming chip 70.

The fifth method also allows the user to confirm that the gaming chip 70 did indeed leave the vault 11 and was received at the main bank room 12 based on the history H91 and the history H92, since the location information 603 is recorded, as shown in FIG. 18.

It is also possible to decide which of the above first to five methods to use for each combination of source and destination. For example, the fourth or fifth method may be used to move the gaming chips 70 in the cage 11, the second method to specify the destination at the source may be used to move the chips from the F/C bank room 13 to the game table, and the first method to specify the source at the destination may be used to move the chips from the game table to the F/C bank room 13.

Purchase and Redemption at Cashier

When the gaming chip 70 is transferred from the cashier room 14 to the player (the player purchases the gaming chip 70 at the cashier), the cashier computer 141 reads the chip ID of the gaming chip 70 with the cashier chip reader 143, and the cashier card reader 142 reads the player ID from the player's ID card, and reports the player as an designation with the read chip ID to the chip management computer 100. The chip management computer 100 updates the chip management database 101 in response to this report.

When the gaming chip 70 is moved from the player to the cashier room 14 (the player redeems the gaming chip 70 at the cashier), the cashier computer 141 reads the chip ID of the gaming chip 70 with the cashier chip reader 143 and the cashier card reader 14 reads the player ID from the player's ID card, and reports the player as a designation from whom the chip was moved along with the read chip ID to the chip management computer 100. The chip management computer 100 updates the chip management database 101 in response to this report.

FIG. 19 shows an example of data in a chip management database that is updated by the fourth method of managing movement of the gaming chips according to the second embodiment of the present invention. In the example of FIG. 19, player 5 purchases a gaming chip 70 at the cashier 2 (histories H101 and H102), and then the player 5 redeems the gaming chips 70 at cashier 3 (histories H103 and H104). In the case of the first to third methods, only the source (cashier) and destination (player) information can be recorded with the entry/exit information 602 as N/A.

For example, in a cashier, when the cashier staff receives a gaming chip 70 from a player, the cashier staff specifies that the cashier will receive the chip and then reads the chip ID of the gaming chip 70 using the cashier chip reader 143. In the case of handing over the gaming chip 70 to the player, the player may specify that he or she will receive the gaming chip and then use the cashier chip reader 143 to read the chip ID of the gaming chip 70.

This makes it clear, using a single chip reader, whether the gaming chip 70 whose chip ID is read by the chip reader is entering or leaving the location. Also, in the case of chip exchange, the chip reader can be used to clearly distinguish between gaming chips 70 received from a player and gaming chips 70 given to a player, and identify their chip IDs.

Collection and Payout

A player who has purchased a gaming chip 70 can play a game at a game table. In this case, the game table first reads the player's ID card with the table card reader 152 equipped with the ID card antenna 512. When the table card reader 152 reads the player's ID card, the playing position of the player is specified. This allows the system to recognize which betting area is occupied by which player. The betting area antennas 515a to 515e may be one or more antennas that read a plurality of betting areas together as one betting area without distinguishing each player position, and read the gaming chips 70 placed in the one betting area. In addition, there may be no antennas in the betting area.

If a player loses a game at the table, the betting gaming chips 70 are collected. In this case, the chip tray antenna 514 reads the chip IDs of the gaming chips 70 contained in the chip tray before collection and also after collection. By comparing the chip IDs of the chip trays before and after collection, the table computer 151 recognizes the chip IDs of the gaming chips 70 that are newly brought into the chip tray (i.e., collected from the player).

The table computer 151 reports the chip ID read by the chip tray antenna 14 to the chip management computer 100 for the gaming chip 70 collected from the player, together with the designation that it is a move to the chip tray of the game table. The chip management computer 100 updates the chip management database 101 in response to this report.

In the case that by using the betting area antennas 515a to 515e to recognize the chip IDs of the betting gaming chips 70 and to recognize the game results, the table computer 151 can determine for each betting gaming chip 70 whether it should be collected or not, it may update the movement history of the gaming chip 70 in the chip management database 101 to the effect that it leaves the player and moves to the game table in accordance with such determination when the bet gaming chip 70 should be collected. Such an update and the subsequent update to the effect that the gaming chip 70 has been accepted by the chip tray can be used to confirm that the gaming chip 70 to be collected has indeed been collected by the chip tray. In other words, if a movement history is recorded in which the entry/exit information 602 is "OUT" and the location information 603 is one of the players as it should be collected, but there is no subsequent movement history of receipt in the chip tray, it is clear that the gaming chip 70 to be recovered has not been recovered correctly.

In this embodiment, the chip IDs newly brought into the chip tray by the collection are determined by comparing the chip IDs read out from the chip tray before and after the collection, but alternatively, the chip tray may have a special chip recovery area that temporarily houses the recovered chip tray, and the chip ID of the recovered gaming chip 70 may be determined by installing an antenna in the recovery chip area that is independent of the rest of the chip tray.

Alternatively, the chip ID of the gaming chip 70 to be collected may be identified by having the dealer antenna read the RFID 71 on the way from the betting area to the chip tray.

When a player wins a game, he/she receives a payout of the gaming chip 70. For the gaming chips 70 to be paid out to the player from the chip tray, the dealer first places them in the dealer area of the game table. At this time, the dealer antenna 513 reads the chip ID from the RFID tag 71 of the gaming chip 70 in the dealer area. Since the table computer 151 knows which players are playing in each betting area, it can link the gaming chip 70 to be paid out with the player who will receive the payout (the location information of the gaming chip 70 to be redeemed is the player concerned).

The method of identifying the chip ID of the paid-out gaming chip 70 and linking it to the player is not limited to the above. For example, the table computer 151 can identify the chip ID of the gaming chip 70 to be paid out by reading the chip ID of the gaming chip 70 in the chip tray before and after the payout, and link it to the player who receives the payout.

When the gaming chip 70 to be paid out is placed in the betting area, the chip ID of the gaming chip 70 may be read by the betting area antenna 515 of the betting area. In this case, the chip ID of the paid-out gaming chip 70 (associated with the dealer or casino) as well as the chip ID of the gaming chip 70 that was bet on (associated with the player) will be read. The chip management computer 100 associates the chip ID of the paid-out gaming chip 70 with the player who is associated the chip ID of the gaming chip 70 that had been bet on.

An antenna and reading area for reading the RFID tag 71 of the gaming chip 70 to be paid out may be provided at each player position. Such antennas and reading areas may be located between the betting area of each player position and the dealer. In this case, it is still known which player is in each player position, so that the paid-out gaming chip 70 can be associated with the player ID. In this case, the dealer may first have the paid-out gaming chip 70 read by the antenna in the reading area of the corresponding player position, and then move the paid-out gaming chip 70 to the betting area next to the betting chips. The paid-out gaming chip 70 may be moved to the betting area next to the betting chips, or the corresponding player may take the redeemed gaming chip 70 that the dealer has placed in the reading area.

The table computer 151 reports the combination of the chip ID of the gaming chip 70 to be paid out and the player ID of the player receiving the payout to the chip management computer 100. In response to this report, the chip management computer 100 updates the movement history in the chip management database 101 to the effect that the gaming chip 70 that was on the game table has been moved to the player.

Even at the time of payout, the chip ID of the gaming chip 70 to be paid out may be identified by having the RFID tag 71 read by the dealer antenna once the gaming chip 70 is removed from the chip tray.

In the examples of FIGS. 15 to 19 above, in each movement history of each gaming chip 70, not only the information of the location but also the staff ID of the staff involved in the movement at that location may be recorded. In each movement history, the status information of the gaming chip 70, such as "valid", "invalid", "missing", "suspicious", "not redeemable", "not playable", etc., may be recorded. A flag may also be used to indicate whether it is valid or invalid. Furthermore, in the examples of FIGS. 15 to 19 above, each movement history record may have information on the face value of each gaming chip 70 as well as its chip ID.

As described above, by reading the chip ID at each location, the movement history of each gaming chip 70 can be recorded in the chip management database 101. This allows the chip management computer 100 to realize various functions described below.

Time Limit and Detection of Different Destinations

In this function, the chip management computer 100 monitors the movement of the gaming chips 70 between the F/C bank room 13 and the game table and issues an alert if there is a problem with the movement. In other words, the chip management computer 100 starts timing when it receives a report from the F/C bank computer 131 that a certain gaming chip 70 has left the F/C bank room 13 to one of the game tables. If the chip management computer 100 does not receive a report from the table computer 151 of the destination game table that the gaming chip 70 has been received within a predetermined time (e.g., 5 minutes), it may issue an alert. This alert may be sent to the dealer of the relevant game table, the pit manager managing the relevant game table, and so on. At this time, the chip management computer 100 may update the status of the gaming chip 70 in the chip management database 101 to "missing", "not redeemable", "not playable", etc.

In addition, when the chip management computer 100 receives a report from the F/C bank computer 131 that a certain gaming chip 70 has left the F/C bank room 13 with one of the game tables designated as the destination, the chip management computer 100 may receive a report from the game table computer 151 that the gaming chip 70 has left the F/C bank room 13 with a game table other than the one designated as the destination. An alert may also be issued when a report is received from the table computer 151 of a gaming table other than the one designated as the destination that the gaming chip 70 has been received. In this case, the chip management computer 100 may update the status of the gaming chip 70 in the chip management database 101 to "wrong Destination", "not redeemable", "bot playable", etc.

Detection of Improper Movement

In this function, the chip management computer 100 refers to the chip management database 101 and issues an alert when there is an inappropriate movement of the gaming chip 70. The movement of the gaming chips 70 is limited to the patterns shown in FIG. 14, and any other movement patterns other than these are inappropriate movements. Therefore, each time the chip management computer 100 updates the chip management database 101, it determines whether or not the movement for that update is appropriate.

For example, if the cage 10 has the configuration shown in FIG. 10, no gaming chips 70 are moved directly from the vault 11 to the cashier room 14, and for example, no gaming chips 70 that have not been moved from the cashier room 14 to the player are collected at the game table, and if these movement histories are discovered, the chip management computer 100 determines that it is an improper movement. In addition, if a gaming chip 70 that is supposed to be in the possession of one player is redeemed at a cashier by another player, the possibility of money laundering is suspected. In this way, the chip management computer 100 detects inappropriate transfers and issues an alert.

Total Amount of Player Chips in Real Time

In this function, the chip management computer 100, by referring to the chip management database 101, extracts only the gaming chips 70 held by any of the players in the latest information of the movement history and calculates the total amount of those chips, thereby determining the total amount of chips 70 held by all the players at that time, i.e., the casino's outstanding debt at that time.

The total amount of player chips may be calculated as the total amount of all gaming chips managed in the chip management database 101 minus the total amount of all gaming chips 70 in the cage 10 and the total amount of all gaming chips 70 at the game table.

Central Management of Fills and Credits

In this function, the chip management computer 100 extracts, for each game table, the gaming chips 70 in that game table by referring to the chip management database 101, and detects the number of chips per face value. Then, if there are gaming chips 70 of a face value amount for which the number of chips is insufficient, a notification may be issued to the F/C bank computer 131 in the F/C bank room 13 and the table computer 151 of the game table in question to replenish (fill) the gaming chips 70 of that face value amount. The notification may specify the number of gaming chips 70 per face value to be refilled or the total amount of gaming chips 70 per face value to be refilled.

By referring to the chip management database 101, the chip management computer 100 extracts the gaming chips 70 in each game table and detects the total number of gaming chips 70 in that game table. If the total number of chips exceeds the predetermined number, which is close to the upper limit that can be accommodated in the game table, a notice may be issued to the F/C bank computer 131 in the F/C bank room 13 and the table computer 151 of the game table to collect (credit) the gaming chips 70 from the table.

The notice may specify the number of gaming chips 70 per face value to be replenished or the total amount of gaming chips 70 per face value to be replenished.

The notification may also be issued in the same manner for the movement of gaming chips 70 within the cage 10. For example, when the number of gaming chips 70 becomes low in a certain window of the cashier room 14, a notification may be issued to the cashier computer 141 and the main bank computer 121 to urge them to replenish the cashier room 14 with gaming chips 70.

In the above, a notification urging movement was issued to both the destination and the source, but instead, a notification may be issued to only one of the destination and the source. At the location that receives the notification to move, the staff member instructs the computer at that location via an input device whether to accept the proposal to move, and the computer at that location may notify the other location of the order to move if either the destination or the source location accepts the proposal. If one of the locations accepts the proposal, the computer of the location may notify the other location of the order to move.

Management of Multiple Gaming Chip Moves

In the above, the method of managing movement by updating the movement history in the chip management database 101 for each gaming chip 70 was explained. However, it is also possible to manage whether those multiple gaming chips 70 have moved without excess or shortage when multiple gaming chips 70 move between locations.

The following describes an example of a case in which multiple gaming chips 70 are moved from F/C bank room 13 to a game table (fill). When the gaming chips 70 are moved from F/C bank room 13 to a given game table, F/C bank staff 33 read the chip ID of the moved gaming chip 70 with the F/C bank chip reader 133 in the F/C bank room 13. The F/C bank computer 131 reports the read chip ID to the chip management computer 100. The chip management computer 100 stores the chip IDs (source chip IDs) of the plurality of gaming chips 70 pertaining to the fill, and also obtains the face value of those chip IDs by referring to the chip management database 101 based on the report, to ascertain the total amount of gaming chips 70 pertaining to the fill (source total amount). This allows the chip management computer 100 to determine the source chip ID, the total number of gaming chips 70 pertaining to the fill (total number of chips in the source of the movement), and the source total amount based on the information from the F/C bank computer 131.

When the gaming chips 70 are brought to the game table, the dealer reads the chip IDs of the brought gaming chips 70 by the table chip reader at the game table, and the table computer 151 reports the plurality of the read chip IDs to the chip management computer 100. The chip management computer 100 stores those plurality of chip IDs (destination chip IDs), and also obtains the face value of those chip IDs by referring to the chip management database 101 based on the report, and ascertains the total amount of gaming chips 70 pertaining to the fill (destination total amount). In this way, the chip management computer 100 determines the destination chip ID, the total number of gaming chips 70 pertaining to the fill (destination total number), and the destination total amount based on the information from the table computer 151.

The chip management computer 100 compares the source chip ID and the destination chip ID to determine whether or not they are an exact match. The chip management computer 100 also compares the total amount of the source chip and the total amount of the destination chip to determine whether they match. In addition, the chip management computer 100 compares the total number of chips to be moved with the total number of chips to be moved, and determines whether they match or not. If there is a discrepancy in any of the above comparisons, the chip management computer 100 determines that the movement was not performed correctly and issues an alert.

In the case of moving a plurality of gaming chips 70 from the game table to the F/C bank room 13 (credits), the following applies. When a gaming chip 70 is moved from the game table to the F/C bank room 13, the dealer reads the chip ID of the moving gaming chip 70 using the table chip reader 153 at the game table. The table computer 151 reports the read chip ID to the chip management computer 100. The chip management computer 100 stores the chip IDs of the plurality of gaming chips 70 pertaining to the credits (source chip ID), and also obtains the face value of those chip IDs by referring to the chip management database 101 based on the report, to obtain the total amount of gaming chips 70 pertaining to the credits (source total amount). In this way, the chip management computer 100 determines the source chip ID, the total number of gaming chips 70 pertaining to the credits (source total number), and the source total amount based on the information from the table computer 151.

When the gaming chips 70 are brought to the F/C bank room 13, the F/C bank staff 33 reads the chip IDs of the brought gaming chips 70 by the F/C bank chip reader 133, and the F/C bank computer 131 reports the read plurality of chip IDs to the chip management computer. The chip management computer 100 stores those plurality of chip IDs (destination chip IDs) and, based on the report, refers to the chip management database 101 to obtain the face values of those chip IDs to ascertain the total amount of gaming chips 70 (destination total amount) for credits. In this way, the chip management computer 100 determines the destination chip ID, the total number of gaming chips 70 pertaining to the credits (destination total number), and the destination total amount based on the information from the F/C bank computer 131.

The chip management computer 100 compares the source chip ID and the destination chip ID to determine whether or not they are an exact match. In addition, the chip management computer 100 compares the source total amount and the destination total amount, and determines whether they match or not. In addition, the chip management computer 100 compares the source total number and the destination total number, and determines whether they match or not. If there is a discrepancy in any of the above comparisons, the chip management computer 100 determines that the movement was not performed correctly and issues an alert.

In the above, the chip ID, the total amount, and the total number of chips are all compared, but only one of them may be compared to determine whether or not the transfer was made correctly. The total amount and the total number of chips may also be calculated and compared for each face value of the gaming chips 70. For example, the source total amount and the destination total amount may be calculated as "$600 in $10 chips, $400 in $100 chips".

If the chip management computer 100 notifies the destination or the source of the move to encourage the move, at least one of the following may be performed: a comparison between the notification and the source total amount, a comparison between the notification and the destination total amount, a comparison between the notification and the source total number, and a comparison between the notification and the destination total number so that it is possible to determine whether the move was performed accurately.

Management of Fill by Increasing Amount at Game Table

When a gaming chip 70 is transported from the F/C bank room 13 to a game table and the gaming chip 70 is replenished at the game table (fill), the chip IDs of the gaming chips 70 being transported to the game table are read by the F/C bank chip reader 133, and the chip IDs of the gaming chips 70 are stored in the F/C bank chip reader 133. These chip IDs are reported from the F/C bank computer 131 to the chip management computer 100. The chip management computer 100 calculates the total amount of the reported gaming chips 70 (total fill amount) by referring to the chip management database 101.

By referring to the chip management database 101, the chip management computer 100 extracts the gaming chips 70 in the game table prior to the fill and calculates the total amount of the gaming chips 70 (existing total amount). Then, the chip management computer 100 calculates the theoretical total amount of gaming chips 70 in the game table after the fill (theoretical total amount after fill) by adding the total fill amount to the calculated existing total amount.

At a game table, when a gaming chip 70 is brought in from the F/C bank room 13, the table chip reader 153 of the game table reads the chip ID of the brought-in gaming chip 70 and reports it to the chip management computer 100 by the table computer 151. The chip management computer 100 obtains the face values of the reported chip IDs by referring to the chip management database 101, and calculates the actual total amount of gaming chips 70 in the chip tray (actual total amount after fill).

If the game table is equipped with a cabinet or has a double chip tray, i.e., if the game table has a place to store chips other than the chip tray, the table computer 151 calculates the total amount of gaming chips 70 of the entire game table including the chip tray and such storage place (but not including the player's gaming chips placed in the betting area), as the actual total amount after fill.

The chip management computer 100 compares the theoretical total amount after fill with the actual total amount after fill, and issues an alert if the two do not match. With this configuration, it is possible to check whether the gaming chips 70 have been correctly increased at the game table by fill.

Since the chip IDs of all gaming chips 70 leaving the F/C bank room 13 are determined in the F/C bank room 13, and the chip IDs of all gaming chips 70 moving out of the F/C bank room 13 are determined in the game table, when the theoretical total amount after fill and the actual total amount after fill do not match, the chip ID of the gaming chip 70 that caused the discrepancy can be determined. The chip management computer 100 changes the status of the gaming chip 70 that caused the discrepancy to "invalid", "not redeemable", "not playable", etc.

In the above, the theoretical total amount after fill is compared with the actual total amount after fill. In addition to or instead of the amount of gaming chips 70 (total amount), the number of chips (total number) may be used to compare the theoretical total number of gaming chips 70 after the fill in the game table (theoretical total number after fill) with the actual total number of gaming chips 70 after the fill in the game table (actual total number of after fill) to determine whether the fill is complete without excess or deficiency.

Management of Credit by Reduction at the Game Table

When excess gaming chips 70 at the game table are transported from the game table to the F/C bank room 13 (credit), the chip IDs of the gaming chips 70 being transported to the F/C bank room 13 are read by the table chip reader 153, and these chip IDs are sent to the table computer 151. The chip management computer 100 calculates the total amount (total credit amount) of the reported gaming chips 70 by referring to the chip management database 101.

By referring to the chip management database 101, the chip management computer 100 extracts the gaming chips 70 in the game table in question prior to the credit in question and calculates the total amount (total existing amount). The chip management computer 100 then subtracts the total amount of credits from the calculated existing total amount to calculate the theoretical total amount of gaming chips 70 at the game table in question after the credit (theoretical total amount after credit).

At the game table, when the gaming chips 70 are transported toward the F/C bank room 13, the chip tray chip reader 154 of the game table reads the chip ID of the gaming chips 70 stored at the game table, and the table computer 151 reports the information to the chip management computer 100. The chip management computer 100 obtains the face value of the reported chip IDs by referring to the chip management database 101, and calculates the actual total amount of gaming chips 70 in the chip tray (actual total amount after credit).

If the game table is equipped with a cabinet or has double chip trays, i.e., if the game table has a place to store chips other than the chip tray, the table computer 151 calculates the total amount of gaming chips 70 of the entire game table including the chip tray and such storage place (but not including the player's gaming chips placed in the betting area), as the actual total amount after credit.

The chip management computer 100 compares the theoretical total amount after credit with the actual total amount after credit, and issues an alert if the two do not match. With this configuration, it is possible to check whether the gaming chips 70 are correctly reduced in the game table by credits.

In the game table, since the chip IDs of all gaming chips 70 that are carried from the game table to the F/C bank room 13 are known, and in the F/C bank room 13, the chip IDs of all gaming chips 70 that have been moved from the game table are detected, if the theoretical total amount after credit and the does not match the actual total amount after credit, the chip IDs of the gaming chips 70 that caused the discrepancy can be determined. The chip management computer 100 changes the status of the gaming chip 70 that caused the mismatch to "invalid," "not redeemable," "not playable," or other status.

In the above, the theoretical total amount after credit is compared with the actual total amount after credit. In addition to or instead of the amount of gaming chips 70 (total amount), the number of chips (total number) may be used to compare the theoretical total number of gaming chips 70 after credit in the game table (theoretical total number after credit) with the actual total number of gaming chips 70 after the credit in the game table (actual total number after credit) to determine whether the credit is complete without excess or deficiency.

In the above, the total amount of credits is determined by reading the gaming chips 70 carried in the F/C bank room 13 with the table chip reader 153, and the theoretical total amount after credit is calculated by subtracting the total amount of credits from the existing total amount (the total amount of gaming chips 70 in the game table before the credit). Instead of this, the theoretical total amount after credit can be calculated in the following manner: If the chip management computer 100 issues a notice to the game table urging it to credit, and the game table credits in response to the notice, the total amount or the total number of gaming chips 70 for credit (both of which may be specified for each face value) specified in the notice may be used as the total credit amount, and the total amount after the theoretical credit may be calculated by subtracting the total credit amount from the existing total amount. After calculating the theoretical total amount of credit, in the same manner as described above, the chip management computer 100 may compare the theoretical total amount after credit with the actual total amount after credit (the actual total amount of gaming chips 70 after credit in the game table) to determine whether the specified amount or number of gaming chips 70 (the total amount of actual gaming chips 70 after credits at the game table) have left the game table for credit.

Verification Based on Staff'S Work Shift

The doors of the cage 10 are locked to prevent the arbitrary entry of people, and staff can enter and leave the cage by meeting the security requirements. The same entry and exit security is also implemented between each room in the cage 10. Staff members working in the cage are required to be authenticated when entering or leaving the cage or the room in which they work. When authenticating a staff member to leave the room, the chip management computer 100 verifies that there has been no inappropriate movement of gaming chips 70 between the time the staff member entered the room and that time. The chip management computer 100 will work with the locking system and will not allow the staff to leave the room if there has been an inappropriate movement of gaming chips 70.

Also at the game table, in the same way above, when the dealer leaves the game table, the dealer will have his/her ID card read by the table card reader 152 with specifying the end of his/her shift. At this time, the chip management computer 100 verifies whether there have been any inappropriate transfers of gaming chips 70 since the dealer took charge of the game table in question, and issues an alert if there are any inappropriate transfers. When a dealer is replaced, the chip management computer 100 checks whether the gaming chips 70 that should be on the gaming table are indeed there after the dealer leaves the table and before the next dealer takes over the table, i.e., whether the dealer leaving the table has taken any gaming chips 70 from the gaming table. If there is a problem, the system will issue an alert.

At the game table, the gaming chips 70 may be stored in locations other than the chip tray. For example, the chip tray may be double-layered, and the refillable gaming chips 70 may be stored in the lower chip tray, or the refillable gaming chips 70 may be stored in a cabinet provided by the game table. In these cases, it is desirable that the gaming table is also equipped with an antenna for reading the RFID tags 71 of the gaming chips 70 so stored, and the table computer 151 is able to always read the RFID tags 71 of all the gaming chips 70 in the gaming table.

Monitoring Improper Purchase/Redemption by Players

In this function, the chip management computer 100 verifies the history of the purchase and redemption of gaming chips for each player and issues an alert if there is any suspicious activity. For example, if there is a purchase of more than a predetermined amount of gaming chips 70 and a redemption of more than a predetermined amount of gaming chips 70 within a predetermined time period, an alert is issued for such behavior as suspicious behavior. In addition, if the gaming chips 70 are about to be redeemed without being used at the game table after the gaming chips 70 have been purchased, and the amount of such redemption is more than the predetermined amount, an alert is also issued for such behavior as suspicious behavior. Alternatively, if a player purchases more than a predetermined amount of gaming chips 70 within a predetermined time, an alert will be issued for such behavior as suspicious behavior.

Validation/Invalidation in Cage

The gaming chip 70 may be validate in the cage 10. This ensures security in the event that a gaming chip 70 is stolen between the time it is manufactured and the time it is brought into the cage 10, since such a gaming chip 70 has not been validated and cannot be used. For this purpose, the chip management database 101 has a table that stores the chip IDs of valid gaming chips 70, and the chip management computer 100 refers to the table each time the chip ID of a gaming chip 70 is read by a chip reader at a cashier or game table to determine whether the chip ID is valid or not.

When disposing of the gaming chip 70, the invalidation process is also performed inside the cage 10 before the gaming chip 70 is taken outside the cage 10. This ensures security because even if a gaming chip 70 taken outside the cage 10 for disposal is stolen, such a gaming chip 70 cannot be used in a cashier or table.

Unregistered Player

Even an unregistered player can purchase a gaming chip 70 and play games at the gaming table using the gaming chip 70. For unregistered players, a common anonymous player ID is used. This allows for uninterrupted tracing of the gaming chip 70, even if the gaming chip 70 is moved to an unregistered player as it moves from one location to another, from leaving the cage 10 to returning to the cage 10.

Other

A display device may be provided in the cashier's window to show the total amount of gaming chips 70 and the result of the validation. The cashier staff places the gaming chips 70 to be given to the player or received from the player on the cashier chip reader 143. The cashier chip reader 143 reads the face value and status stored in the RFID tag 71 of the gaming chip 70 (usually more than one). The cashier computer 141 displays on a display device the total value of the face value read by the cashier chip reader 143. In addition to the total amount, the number of the gaming chips 70 of each face value may be displayed.

The cashier computer 141 displays an error message on the display unit if there is a gaming chip 70 whose status is not valid among the read RFID tags 71, and displays a pass message on the display unit if the status of all gaming chips 70 is valid, or displays nothing. In addition to the status, the system may also display whether there has been any improper movement history up to that point. This allows the cashier staff and the player to agree on the validity and the total amount of the gaming chips to be given to the player or received from the player to give or receive the gaming chips 70.

In the above embodiment, when the RFID tag 71 of the gaming chip 70 is read by the chip reader at each location, the chip management computer 100 confirms the validity of the chip ID by verifying whether the read chip ID is that of a valid chip, and if there is a problem, an alert may be issued. For this purpose, a table of valid chip IDs is recorded in the chip management database 101, and the chip management computer 100 refers to this table to verify whether the chip ID read at each location is valid. The chip IDs may be encrypted.

In the above embodiment, in addition to or instead of issuing an alert, the chip management computer 100 may flag the corresponding player, gaming chip 70, or movement history record to indicate an abnormality and record the time.

The configuration of the rooms in cage 10 is not limited to those described above, and the number of rooms and the arrangement of the rooms may be arbitrary. The game table may be a table for playing baccarat, blackjack, or other card games, and the game hall may include locations for playing other games, such as roulette, in addition to the game table.

Each of the above computers is equipped with a processor and memory, and the processor performs the above operations by executing a computer program stored in the memory. The program may be provided to the computer by a non-transitory storage medium, or may be provided to the computer in the form of a download. The communication between computers may be wired or wireless. In addition, in the above implementation, staff and players were identified at each location by each card reader reading an ID card, but instead of ID cards, staff and players may be identified by biometrics such as fingerprints, facial images, irises, and voice prints.

In the above embodiment, each room in the cage 10 and the game table are used as examples of locations to explain the management of the movement of gaming chips 70 between locations, but the examples of locations are not limited to these. For example, a chip tray at a game table where the dealer collects chips and dispenses redemption chips from it, a cabinet at a table where gaming chips are stored, and the upper and lower chip trays in the case where the chip tray consists of two tiers can each be a location of the above, embodiment. The movement of gaming chips 70 between the respective locations can be managed in the same manner as described above.

For example, the chip ID, total amount, and/or total number of gaming chips 70 removed from the cabinet of a certain game table can be determined, and an alert can be issued when the chip ID, total amount, and/or total number of chips have not been moved to the chip tray of the same game table within a predetermined time. This can be done in the following way. For example, in a certain double chip tray, the system may confirm that the gaming chips 70 removed from the lower chip tray have been moved to the upper chip tray, or that the gaming chips 70 removed from the upper chip tray have been moved to the lower chip tray.

When a fill is performed, the gaming chips 70 brought from the F/C bank room 13 to the game table are read using the dealer antenna 513, betting area antenna 515, or tray antenna 514. The chip tray is equipped with buttons to recognize the start and end of the fill operation, and the gaming chips 70 in the chip tray before the fill are compared to the gaming chips 70 in the chip tray after the fill, and the gaming chips 70 increased by the fill are recognized as filled gaming chips 70.

When credit is performed, the gaming chips 70 that are carried to the F/C bank room 13 are read by the dealer antenna 513, betting area antenna 515, or chip tray antenna 514. The chip tray is equipped with buttons to recognize the beginning and end of the credit operation, and the gaming chips 70 in the chip tray before credit are compared with the gaming chips 70 after credit, and the gaming chips 70 reduced by credit are recognized as gaming chips 70 to be credited.

The chip management computer 100 may be capable of outputting the inventory (chip ID) of chips in each location (cage, chip tray, etc.). The chip management computer 100 may be able to specify a point in time in the past and output the inventory at that point in time.

The chip management computer 100 may also be able to issue an alert when a suspicious gaming chip (flagged gaming chip) is about to be redeemed at the cashier.

The chip management database 101 may also be able to store the redemption history of each player. The chip management computer 100 may be able to output the chip ID that the player should have.

Information such as the chip set, casino information, location information, and redemption possibility may be written to the RFID tag 71. Alternatively, such information may be associated with the chip ID and stored in the chip management database 101. The chip management computer 100 or a computer at each location may inspect the RFID tag 71 when it is read at a location to see if it is the gaming chip 70 that should be at that location based on the information.

In addition, a set of gaming chips 70 (chip set) that can be used in each area and the type of gaming chips may be set. For example, when an RFID tag 71 is read at a certain gaming table, the table computer 151 or chip management computer 100 inspects whether it is a chip set that is allowed to be used at that gaming table.

The gaming chips 70 that have been in use for a certain number of years may be flagged in association with the chip ID. The gaming chips that have been in use for a certain number of years can be collected with specifying a collecting location. If a player is in possession of a gaming chip 70 that has been in use for a certain number of years, a signal will be output when the chip ID is detected by the cashier or game table.

When a player in possession of a gaming chip 70 that may have been stolen arrives at the table, the table computer 151 or chip management computer may issue a warning to the staff (watchman). The cashier computer 141 or the chip management computer 100 detects chips that are purchased and then redeemed without being played to prevent money laundering.

The cashier associates the player's photo with the chip ID when a player redeems or purchases chips above a threshold amount. Also, anonymous players (players without member cards) will be given a unique ID to trace their chips. For anonymous players, their faces may be photographed at the time of chip purchase, and the player ID may be associated with the face image and registered in the chip management database 101. At each subsequent location (table, cashier, etc.), the player ID may be identified by face recognition. The chip management computer 100 may set the status of all chips associated with the blacklisted player as invalid.

When a player without a member card wagers a gaming chip 70 at a game table, the chip management computer 100 records the play in the chip management database 101 by linking the play to the unique ID issued on the spot and/or the player ID associated with the gaming chip 70. At this time, a facial image or ID from facial recognition may be tied to the play. If the member card is recognized later, the play record may be tied to the member card ID retroactively.

The above embodiment discloses the technology described in the following appendices.

Appendix A1

A casino system in a casino that uses casino item with an RFID tag that stores identification information, the casino system comprising: a registration device configured to register the identification information of the casino item to be used in the casino; and a storage device configured to store a first list of the identification information registered by the registration device, wherein the first list includes status information that indicates whether or not the casino item is usable, the registration device is configured to set the status information usable for the casino item that have already been registered, when using in the casino.

Appendix A2

The casino system according to Appendix A1, wherein the registration device is configured to set the status information usable for the casino item that has already been registered and is stored in a storage location, when taking out the casino item from the storage location for use in the casino.

Appendix A3

The casino system according to Appendix A1, wherein the registration device is configured, when the identification information in a second list provided by a manufacturer of the casino item matches the identification information stored in the RFID tag of the casino item, to store the identification information in the first list.

Appendix A4

The casino system according to Appendix A1, wherein the registration device is configured to store the identification information in the first list for the casino item for which, at the manufacturer of the casino item, it is determined that the identification information in the second list matches the identification information stored in the RFID tag of the casino item.

Appendix A5

The casino system according to Appendix A1, further comprising: a reading device configured to read the RFID tags of a plurality of the casino items housed in a case, wherein the registration device is configured to register a plurality of the identification information read by the reading device.

Appendix A6

The casino system according to Appendix A1, wherein the registration device is configured to perform a cancellation process to set the status information of the casino item unusable, when the casino item whose status information is usable satisfies a predetermined condition.

Appendix A7

The casino system according to Appendix A6, wherein the registration device is configured, for the casino item for which a cancellation process has been performed and that satisfies the predetermined conditions, to set the status information of the casino item usable again.

Appendix A8

The casino system according to Appendix A6, wherein the status information indicating that the casino item is unusable includes at least one of the following: information indicating that the casino item is unusable; information indicating that the casino item is suspected to be fraudulent; information indicating that the status of the casino item is unknown; information indicating that the item requires attention; and information indicating that the item has been discarded.

Appendix A9

The casino system according to Appendix A6, further comprising: a reading device configured to read the identification information from the RFID tag of the casino item, wherein the registration device is configured to perform the cancellation process for the casino items for which the identification information cannot be effectively read by the reading device.

Appendix A10

The casino system according to Appendix A9, further comprising: a reading device configured to read the identification information from the RFID tag of the casino item, wherein the casino item carries information for identifying the casino item in a manner other than the RFID tag, the registration device is configured to perform the cancellation process for the casino item from which the identification information cannot be read by the reading device by identifying the casino item to be performed the cancellation process using the information for identifying the casino item.

Appendix A11

The casino system according to Appendix A6, wherein the registration device is configured to perform the cancellation process for the casino item that are related to or suspected to be related to an illegal game.

Appendix A12

The casino system according to Appendix A6, further comprising: a reading device configured to read the identification information from the RFID tag of the casino item, wherein the casino item carries information for identifying the casino item in a manner other than the RFID tag, the registration device is configured, when the identification information read from the RFID tag of the casino item by the reading device is not registered in the storage device as an identification information of a usable casino item, to perform the cancellation process by identifying the casino item to be performed the cancellation process using the information for identifying the casino item.

Appendix A13

The casino system according to Appendix A6, wherein the RFID tag stores manufacturing information indicating the manufacturing situation of the casino item, type information indicating a type of the casino item, and/or information indicating a casino where the casino item is used, the storage device is configured to store the manufacturing information, the type information, and/or the casino information corresponding to the identification information along with the identification information, the registration device is configured, when the manufacturing information, the type information, and/or the casino information stored in the RFID tag and the manufacturing information, said type information, and/or said casino information stored in the storage device do not match, to perform the cancellation process for the casino item having the identification information.

Appendix A14

The casino system according to Appendix A6, wherein the registration device is configured to store in the storage device information indicating year and month in which the identification information of the casino item was registered, and perform the cancellation process for the casino item for which a predetermined period of time has elapsed since the year and month of registration by referring to the storage device.

Appendix A15

The casino system according to Appendix A6, wherein each of a plurality of casino item handling locations in the casino is equipped with a management device configured to notify the registration device of the identification information of the casino item to be canceled the registration as a usable casino item, the registration device is configured to perform the cancellation process for the casino item indicated by the notification from the management device.

Appendix A16

The casino system according to Appendix A15, further comprising: a storage tray configured to store the casino item owned by the casino at the casino item handling location; a reading device configured to monitor the casino item by periodically reading the RFID tag of the casino item stored in the storage tray, wherein the reading device is configured to perform the cancellation process for the casino item illegally taken out of the storage tray.

Appendix A17

The casino system according to Appendix A6, wherein the casino uses a plurality of types of the casino item, for each of the plurality of types of casino item, the registration device is configured to store the type of the casino item along with the identification information in the storage device, the registration device is configured to perform the cancellation process for a specific type of the casino item.

Appendix A18

The casino system according to Appendix A6, wherein each of the plurality of casino item handling locations in the casino is equipped with a reading device configured to read the identification information from the RFID tag of the casino item, the registration device is configured, when the same identification information is read by the reading device at the plurality of casino item handling locations and the combination of the readings satisfies a condition for determining fraud, to perform the cancellation process for the casino item having the identification information.

Appendix A19

The casino system according to Appendix A6, wherein each of the plurality of casino item handling locations in the casino is equipped with a reading device configured to read the identification information from the RFID tag of the casino item, the registration device is configured to perform the cancellation process for the casino item with the identification information that is not read by the reading device at any of the casino item handling locations in the casino for a predetermined period of time or longer.

Appendix A20

The casino system according to Appendix A6, further comprising a reading device configured to read the identification information from the RFID tag of the casino item to be canceled the registration, the registration device is configured to perform the cancellation process for the identification information read by the reading device.

Appendix A21

The casino system according to Appendix A6, further comprising a detection device configured to detect the casino item brought in from outside the casino, at an entrance of the casino, wherein the registration device is configured to perform the cancellation process for the casino item detected by the detection device.

Appendix A22

The casino system according to Appendix A1, wherein the registration device is configured to store the identification information of the casino item that satisfies a predetermined condition among the casino item for which the cancellation process has been performed in the storage device as identification information that cannot be registered, and when a new registration is made, if the identification information of the casino item for the registration is stored in the storage device as the identification information that cannot be registered, cancel the registration.

Appendix A23

The casino system according to any of Appendices A1 to A22, wherein the casino item can be used by a player in a casino to bet in a game and can be exchanged for cash.

Appendix A24

A casino item with an RFID tag storing identification information, used in a casino system according to any of Appendices A1 to A23.

Appendix B1

A casino system in a casino at which a casino items with RFID tags that store identification information are used, the casino system is located at a casino item handling location, the casino system comprising: a storage device configured to store a list of the registered identification information; a reading device configured to read the identification information from the RFID tag of the casino item; a verification device configured to check the identification information read from the casino item by the reading device against the identification information stored in the storage device.

Appendix B2

The casino system according to Appendix B1, further comprising: an optical counting device configured to optically count the number of the casino items, wherein the verification device configured to inspect the casino item by comparing the number of the RFID tags read by the reading device with the number of the RFID tags counted by the optical counting device.

Appendix B3

The casino system according to Appendix B2, further comprising: a display device configured to display a result of reading by the reading device and/or a result of verification by the verification device, wherein the reading device includes an antenna and a reader, and the storage device, the antenna, the reader, the verification device, the display device, and the optical counting device are integrally configured.

Appendix B4

The casino system according to Appendix B1, comprising: a holding mechanism configured to hold a predetermined number of the casino items for which the RFID tags are read by the reading device, wherein the verification device configured to inspect the casino item by comparing the number of the RFID tags read by the reading device with the predetermined number.

Appendix B5

The casino system according to Appendix B4, further comprising: a display device configured to display a result of reading by the reading device and/or a result of verification by the verification device, wherein the reading device includes an antenna and a reader, and the storage device, the antenna, the reader, the verification device, the display device, and the holding mechanism are integrally configured.

Appendix B6

The casino system according to Appendix B1, wherein the RFID tag is configured to store information that can identify a value of the casino item, the verification device is configured to compare the number of the RFID tags read by the reading device with an actual number of the casino items, the casino system further comprises a display device configured to display the value of each of the plurality of casino items read by the reading device or a total value of the plurality of casino items read by the reading device, as a result of the reading by the reading device, and/or display a result of comparison between the number of RFID tags and the actual number of the casino items, as a result of verification by the verification device.

Appendix B7

The casino system according to Appendices B3 or B5, wherein the integrally configured casino system is powered by a battery.

Appendix B8

The casino system according to Appendix B1, further comprising a central system to which a plurality of the casino systems are communicatively connected, wherein the central system is configured to update the list stored in the storage device of each of the plurality of the casino systems.

Appendix B9

The casino system according to Appendix B8, wherein the central system is configured to update the list on a regular basis or at a timing that satisfies a predetermined condition.

Appendix B10

The casino system according to Appendix B1, further comprising a central system to which a plurality of the casino systems are communicatively connected, wherein the central system comprises: a central storage device configured to store a list of the registered identification information, and a central verification device configured to check the identification information read from the casino items and transmitted from the casino system against the identification information stored in the central storage device.

Appendix B11

The casino system according to Appendix B10, wherein the verification device is normally configured to compare the identification information read by the reading device with the identification information read immediately before by the reading device, and when there is a difference between the two, verify the identification information read by the reading device with the identification information stored in the central memory device.

Appendix B12

The casino system according to Appendix B10, wherein the verification device is configured to, when the identification information read by the reading device includes new identification information that is not included in the identification information read by the reading device immediately before, verify the new identification information read by the reading device with the identification information stored in the central memory device.

Appendix B13

The casino system according to Appendix B10, wherein the verification device is normally configured to compare the identification information read by the reading device with the identification information read immediately before by the reading device, and under predetermined conditions, check the identification information read by the reading device against the identification information of the casino items stored in the central memory device.

Appendix B14

The casino system according to Appendix B10, wherein the identification information includes tag identification information assigned by the manufacturer who manufactured the RFID tag and item identification information assigned by the manufacturer who manufactured the casino item to which the RFID tag is attached.

Appendix B15

The casino system according to Appendix B14, wherein the verification device is normally configured to compare the item identification information read from the casino items by the reading device with the item identification information read immediately before by the reading device, and at a predetermined timing and/or under a predetermined condition, check the tag identification information read from the casino item by the reading device against the tag identification information of the casino item stored in the storage device.

Appendix B16

The casino system according to any of Appendices B1 to B15, wherein the casino items can be used by a player in a casino to bet in a game and can be redeemed for cash.

Appendix B17

A casino item with an RFID tag storing identification information, used in a casino system according to any of Appendices B1 to B16.

The invention claimed is:

1. A casino system in a casino that uses casino items with RFID tags that store identification information, the casino system comprising:
   a registration device configured to register an identification information of a casino item to be used in the casino; and
   a storage device configured to store a first list of identification information of casino items registered by the registration device, including the identification information of the casino item to be used in the casino,
   wherein the first list includes status information that indicates whether or not the casino items are usable,
   wherein, after the identification information of the casino item to be used in the casino is registered, the registration device is configured to set the status information of the casino item as usable when the casino item is used in the casino, and
   wherein the registration device is configured to store the identification information in the first list for the casino item for which, at a manufacturer of the casino item, it is determined that an identification information in a second list matches the identification information stored in the RFID tag of the casino item.

2. The casino system according to claim 1, wherein, after the identification information of the casino item is registered, the registration device is configured to set the status information as usable for the casino item when taking out the casino item from the storage location for use in the casino.

3. The casino system according to claim 1, wherein the registration device is configured, when the identification information in the second list provided by a manufacturer of the casino item matches the identification information stored in the RFID tag of the casino item, to store the identification information in the first list.

4. The casino system according to claim 1, further comprising a reading device configured to read RFID tags of a plurality of casino items housed in a case, wherein the registration device is configured to register a plurality of the identification information stored in the RFID tags of the plurality of casino items read by the reading device.

5. The casino system according to claim 1, wherein the registration device is configured to perform a cancellation process to set the status information of the casino item as unusable, when the casino item whose status information is usable satisfies a predetermined condition.

6. The casino system according to claim 5, wherein the registration device is configured, for the casino item for which a cancellation process has been performed and that satisfies the predetermined condition, to set the status information of the casino item as usable again.

7. The casino system according to claim 5, wherein the status information indicating that the casino item is unusable includes:
information indicating that the casino item is unusable;
information indicating that the casino item is suspected to be fraudulent;
information indicating that the status information of the casino item is unknown;
information indicating that the item requires attention;
information indicating that the item has been discarded; or
a combination thereof.

8. The casino system according to claim 5, further comprising a reading device configured to read the identification information from the RFID tag of the casino item, wherein the registration device is configured to perform the cancellation process for casino items based on the identification information of the casino item not being effectively read by the reading device.

9. The casino system according to claim 8, further comprising a reading device configured to read the identification information from the RFID tag of the casino item,
wherein the casino item carries information for identifying the casino item in a manner other than the RFID tag, and
the registration device is configured to perform the cancellation process for the casino item based on the identification information of the casino item not being effectively read by the reading device by identifying the casino item to be performed the cancellation process using the information for identifying the casino item.

10. The casino system according to claim 5, wherein the registration device is configured to perform the cancellation process for the casino item that is related to or suspected to be related to an illegal game.

11. The casino system according to claim 5, further comprising a reading device configured to read the identification information from the RFID tag of the casino item,
wherein the casino item carries information for identifying the casino item in a manner other than the RFID tag, and
the registration device is configured, when the identification information read from the RFID tag of the casino item by the reading device is not registered in the storage device as an identification information of a usable casino item, to perform the cancellation process by identifying the casino item to be performed the cancellation process using the information for identifying the casino item.

12. The casino system according to claim 5, wherein the RFID tag stores manufacturing information indicating a manufacturing situation of the casino item, type information indicating a type of the casino item, and/or a casino information indicating a casino where the casino item is used,
the storage device is configured to store the manufacturing information, the type information, and/or the casino information corresponding to the identification information along with the identification information, and
the registration device is configured, when the manufacturing information, the type information, and/or the casino information stored in the RFID tag and the manufacturing information, the type information, and/or the casino information stored in the storage device do not match, to perform the cancellation process for the casino item having the identification information.

13. The casino system according to claim 5, wherein the registration device is configured to store, in the storage device, information indicating a year and a month in which the identification information of the casino item was registered, and perform the cancellation process for the casino item for which a predetermined period of time has elapsed since the year and month of registration by referring to the storage device.

14. The casino system according to claim 5, wherein each of a plurality of casino item handling locations in the casino is equipped with a management device configured to notify the registration device of the identification information of the casino item to be canceled, wherein, prior to the notification, the casino item to be cancelled is registered as a usable casino item, and
the registration device is configured to perform the cancellation process for the casino item indicated by the notification from the management device.

15. The casino system according to claim 14, further comprising:
a storage tray configured to store the casino item owned by the casino at a casino item handling location; and
a reading device configured to monitor the casino item by periodically reading the RFID tag of the casino item stored in the storage tray,
wherein the reading device is configured to perform the cancellation process for the casino item illegally taken out of the storage tray.

16. The casino system according to claim 5, wherein the casino uses a plurality of types of casino items,
for each of the plurality of types of casino items, the registration device is configured to store the type of the casino item along with the identification information in the storage device of the casino item, and
the registration device is configured to perform the cancellation process for a specific type of the casino item.

17. The casino system according to claim 5, wherein each of a plurality of casino item handling locations in the casino is equipped with a reading device configured to read the identification information from the RFID tag of the casino item, and
the registration device is configured, when the same identification information is read by the reading device at the plurality of casino item handling locations and the combination of the readings satisfies a condition for determining fraud, to perform the cancellation process for the casino item having the identification information.

18. The casino system according to claim 5, wherein each of a plurality of casino item handling locations in the casino is equipped with a reading device configured to read the identification information from the RFID tag of the casino item, and
the registration device is configured to perform the cancellation process for the casino item with the identification information that is not read by the reading device at any of the casino item handling locations in the casino for a predetermined period of time or longer.

19. The casino system according to claim 5, further comprising a reading device configured to read the identification information from the RFID tag of the casino item to be canceled the registration, wherein the registration device is configured to perform the cancellation process for the identification information read by the reading device.

20. The casino system according to claim 5, further comprising a detection device configured to detect the casino item brought in from outside the casino, at an entrance of the casino, wherein the registration device is configured to perform the cancellation process for the casino item detected by the detection device.

21. The casino system according to claim 1, wherein the registration device is configured to store the identification information of the casino item that satisfies a predetermined condition among the casino item for which a cancellation process has been performed in the storage device as identification information that cannot be registered, and when a new registration is made, if the identification information of the casino item for the registration is stored in the storage device as the identification information that cannot be registered, cancel the registration.

* * * * *